United States Patent [19]

Tanaka et al.

[11] Patent Number: 5,341,484
[45] Date of Patent: Aug. 23, 1994

[54] VIRTUAL MACHINE SYSTEM HAVING AN EXTENDED STORAGE

[75] Inventors: Shunji Tanaka, Sagamihara; Akira Yamaoka, Hadano; Hidenori Umeno, Kanagawa; Masatoshi Haraguchi, Fujisawa; Kiyoshi Ogawa; Keiji Saijo, both of Yokohama; Katsumi Takeda, Hadano, all of Japan

[73] Assignee: Hitachi, Ltd., Tokyo, Japan

[21] Appl. No.: 476,434

[22] PCT Filed: Sep. 28, 1989

[86] PCT No.: PCT/JP89/00983

§ 371 Date: May 24, 1990

§ 102(e) Date: May 24, 1990

[87] PCT Pub. No.: WO90/05338

PCT Pub. Date: May 17, 1990

[30] Foreign Application Priority Data

Nov. 2, 1988 [JP] Japan ................. 63-276252
May 26, 1989 [JP] Japan ................. 1-131348

[51] Int. Cl.⁵ .................. G06F 12/00; G06F 12/10
[52] U.S. Cl. .................. 395/400; 395/DIG. 1; 364/228.2; 364/243.2; 364/256.3
[58] Field of Search ................. 395/400, 425; 364/200 MS File, 900 MS File

[56] References Cited

U.S. PATENT DOCUMENTS

| | | | |
|---|---|---|---|
| 4,459,661 | 7/1984 | Kaneda et al. | 395/400 |
| 4,476,524 | 10/1984 | Brown et al. | 395/425 |
| 4,564,903 | 1/1986 | Guyette et al. | 395/425 |
| 4,787,031 | 11/1988 | Karger et al. | 395/800 |
| 4,792,895 | 12/1988 | Tallman | 395/375 |
| 4,802,084 | 1/1989 | Ikeyaga et al. | 395/400 |
| 4,814,975 | 3/1989 | Hirosawa et al. | 395/375 |
| 4,843,541 | 6/1989 | Bean et al. | 395/275 |
| 4,974,145 | 11/1990 | Aoyama et al. | 395/800 |
| 4,991,083 | 2/1991 | Aoyama et al. | 395/400 X |
| 5,088,031 | 2/1992 | Takasaki et al. | 395/400 |
| 5,109,336 | 4/1992 | Guenther et al. | 395/425 |
| 5,109,489 | 4/1992 | Umeno et al. | 395/275 |

FOREIGN PATENT DOCUMENTS

| | | |
|---|---|---|
| 0315945 | 5/1989 | European Pat. Off. . |
| 60-122445 | 6/1985 | Japan . |
| 61-98461 | 5/1986 | Japan . |
| 63-244152 | 10/1988 | Japan . |
| 64-37636 | 2/1989 | Japan . |

OTHER PUBLICATIONS

"Virtual Machine/Extended Architecture Systems Facility Release 2 Additional Enhancements,"0 Programming Announcements, IBM Info. Systems Group, Jan. 26, 1985, pp. 1-3.
IBM-Nachrichten, vol. 10, 1972, pp. 349-365.

Primary Examiner—Joseph L. Dixon
Assistant Examiner—Michael A. Whitefield
Attorney, Agent, or Firm—Antonelli, Terry, Stout & Kraus

[57] ABSTRACT

A virtual machine system in which a plurality of operating systems (OS's) can run on one computer including a physical main storage (physical MS), and at least one physical extended storage (physical ES), each operating system (OS) of the OS's having a virtual MS on the physical MS and at least one virtual ES on the at least one physical ES. The system includes a first address translator for translating a virtual ES address designated by an instruction issued by one OS of the OS's on a virtual space generated by the one OS on one virtual ES of the at least one virtual ES of the one OS to a virtual physical ES address on the one virtual ES based on the virtual ES address and an address of an ES relocation table on the virtual MS of the one OS or an ES relocation register in the computer, the one virtual ES being on one physical ES of the at least one physical ES of the computer, and a second address translator for translating the virtual physical ES address to a physical ES address on the one physical ES based on the virtual physical ES address and a start address of the one virtual ES in the one physical ES.

2 Claims, 15 Drawing Sheets

FIG. 2  MAIN STORAGE
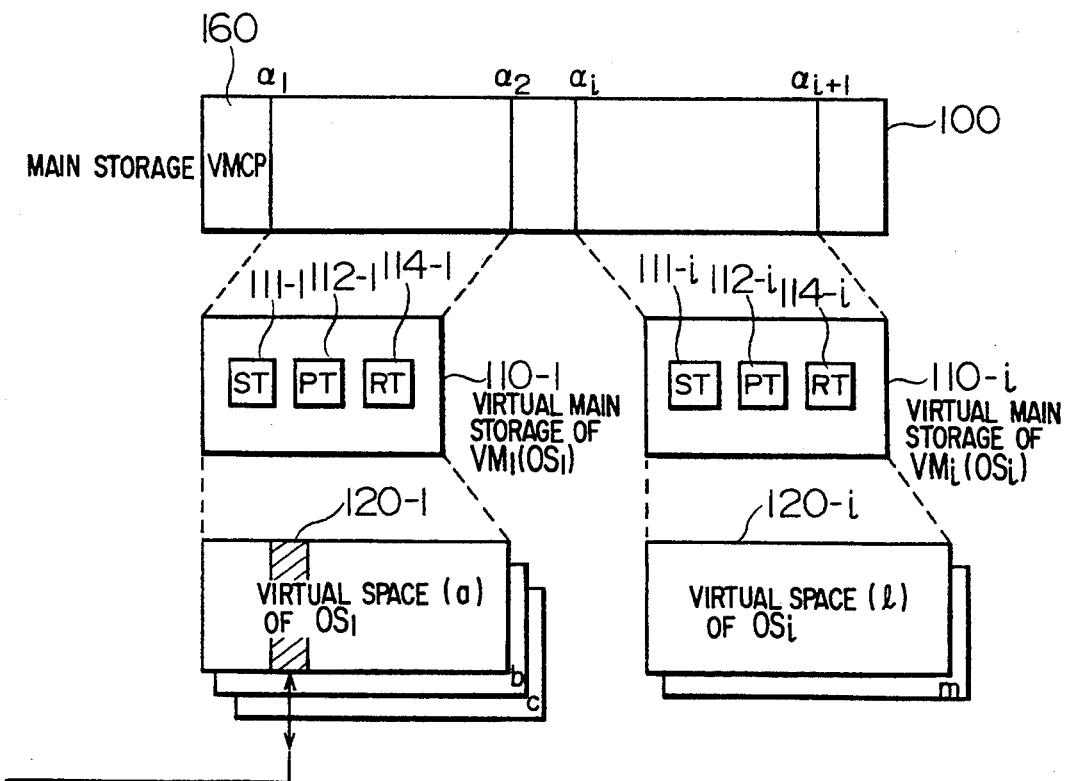
FIG. 3  VIRTUAL EXTENDED STORAGE
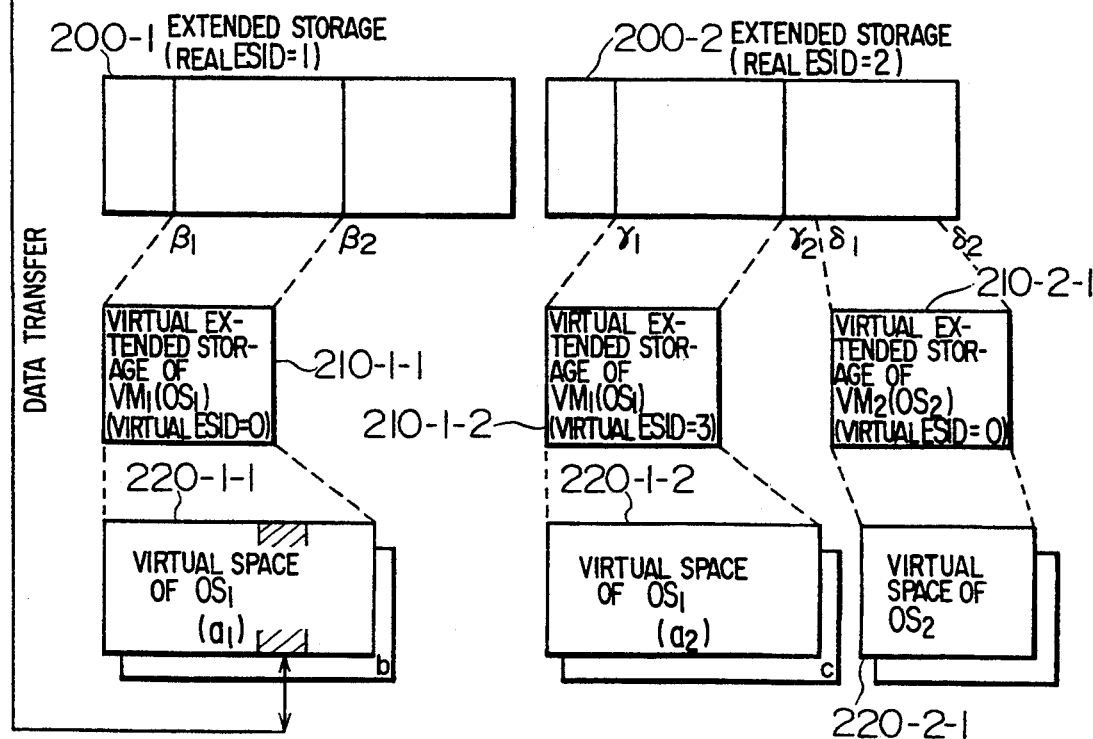

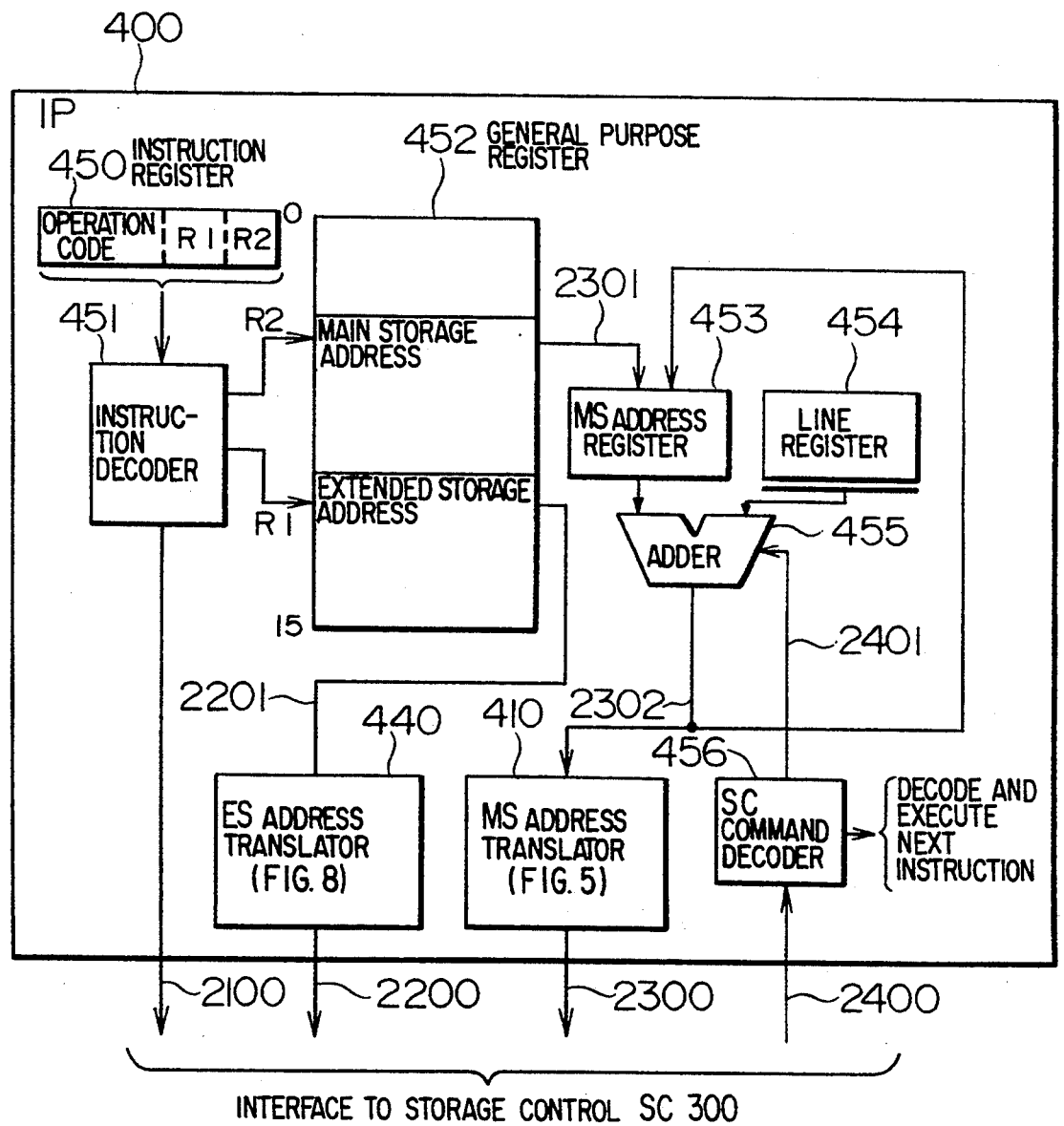
FIG. 4 INSTRUCTION PROCESSOR (IP)

FIG. 6 PRIOR ART — DYNAMIC ADDRESS TRANSLATOR (DAT)

F I G. 11
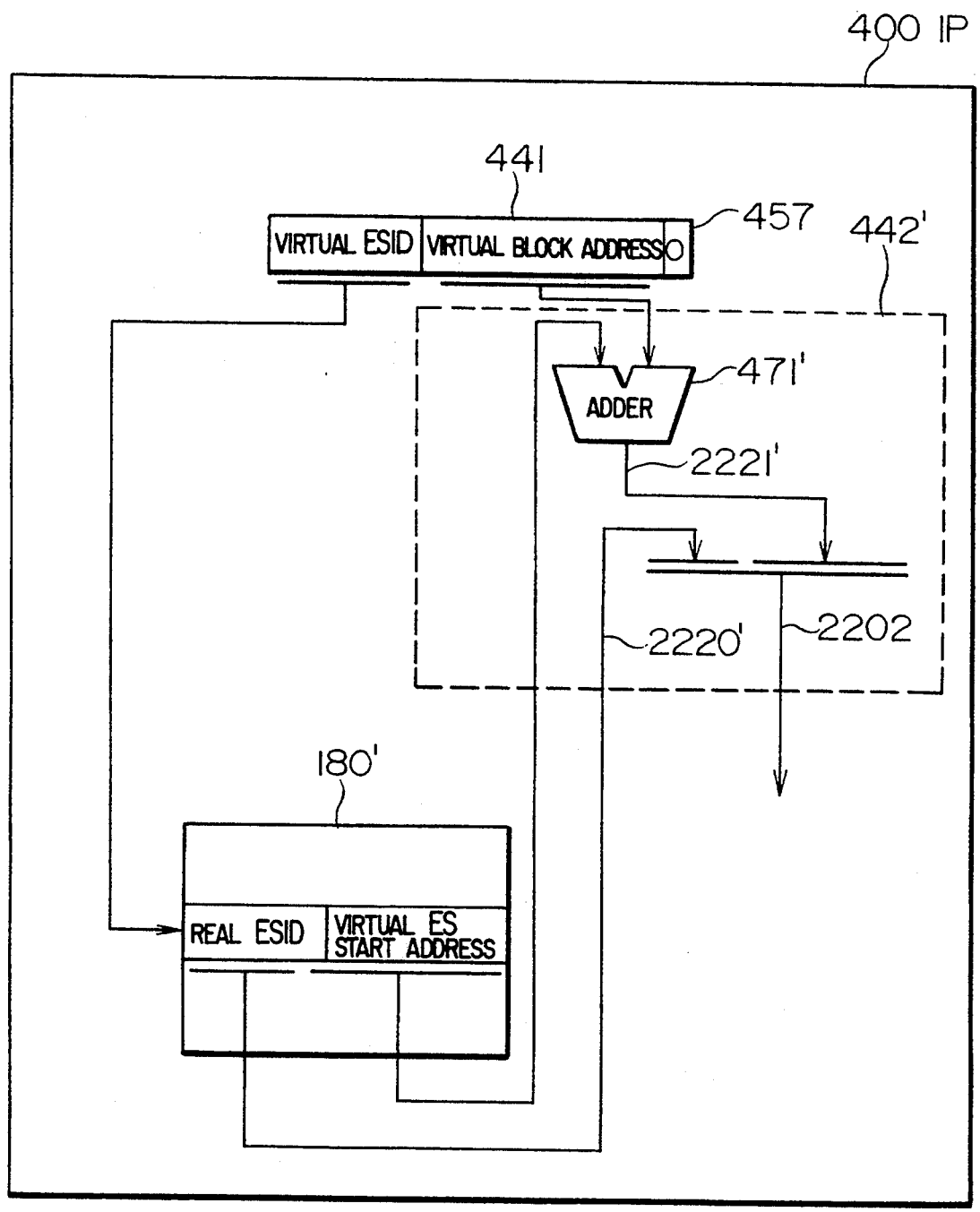

F I G. 13
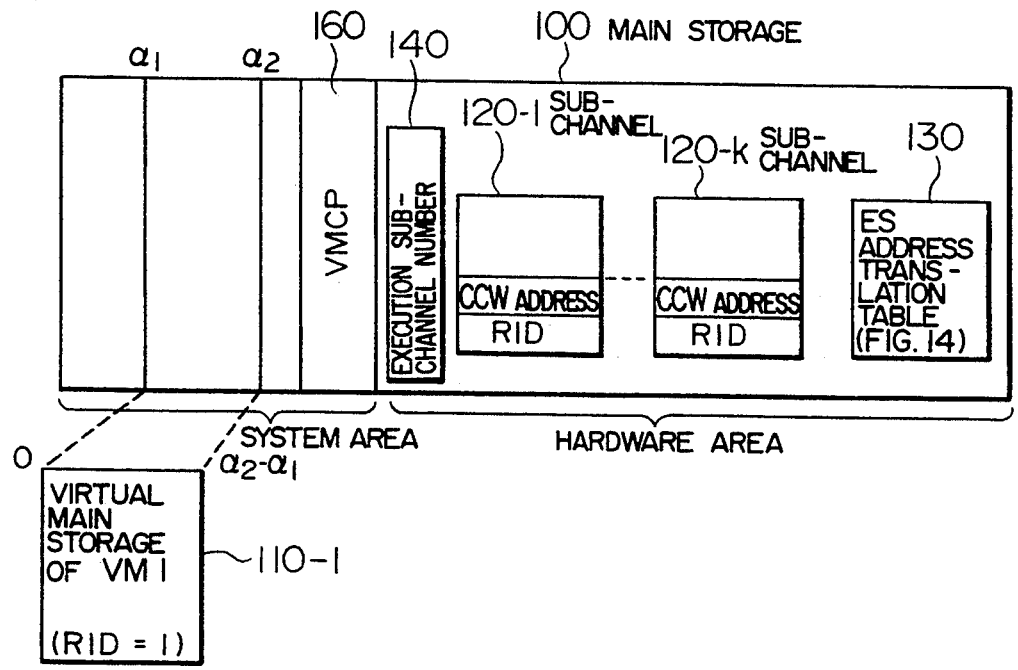
F I G. 14
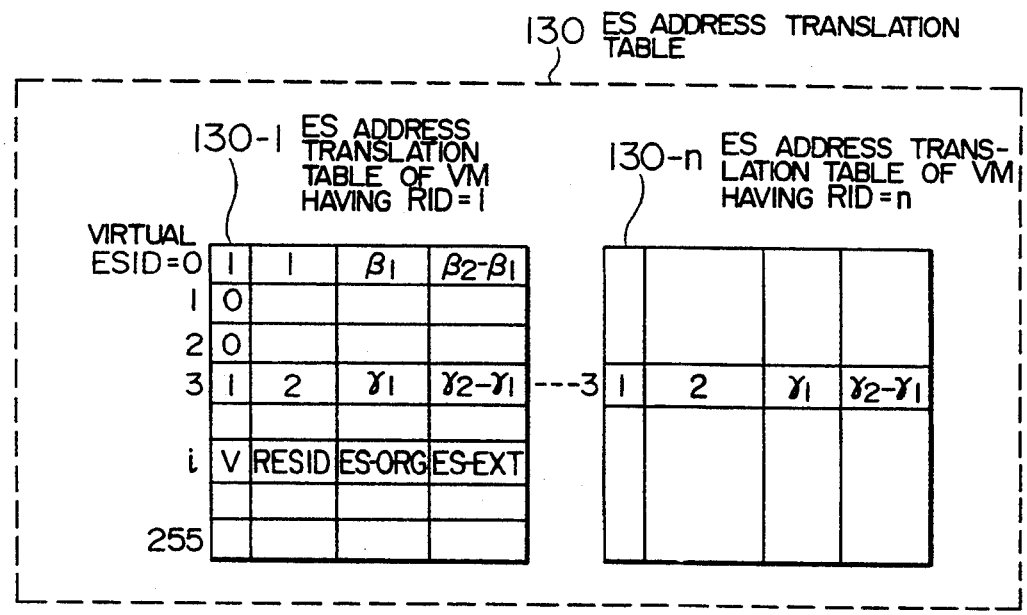

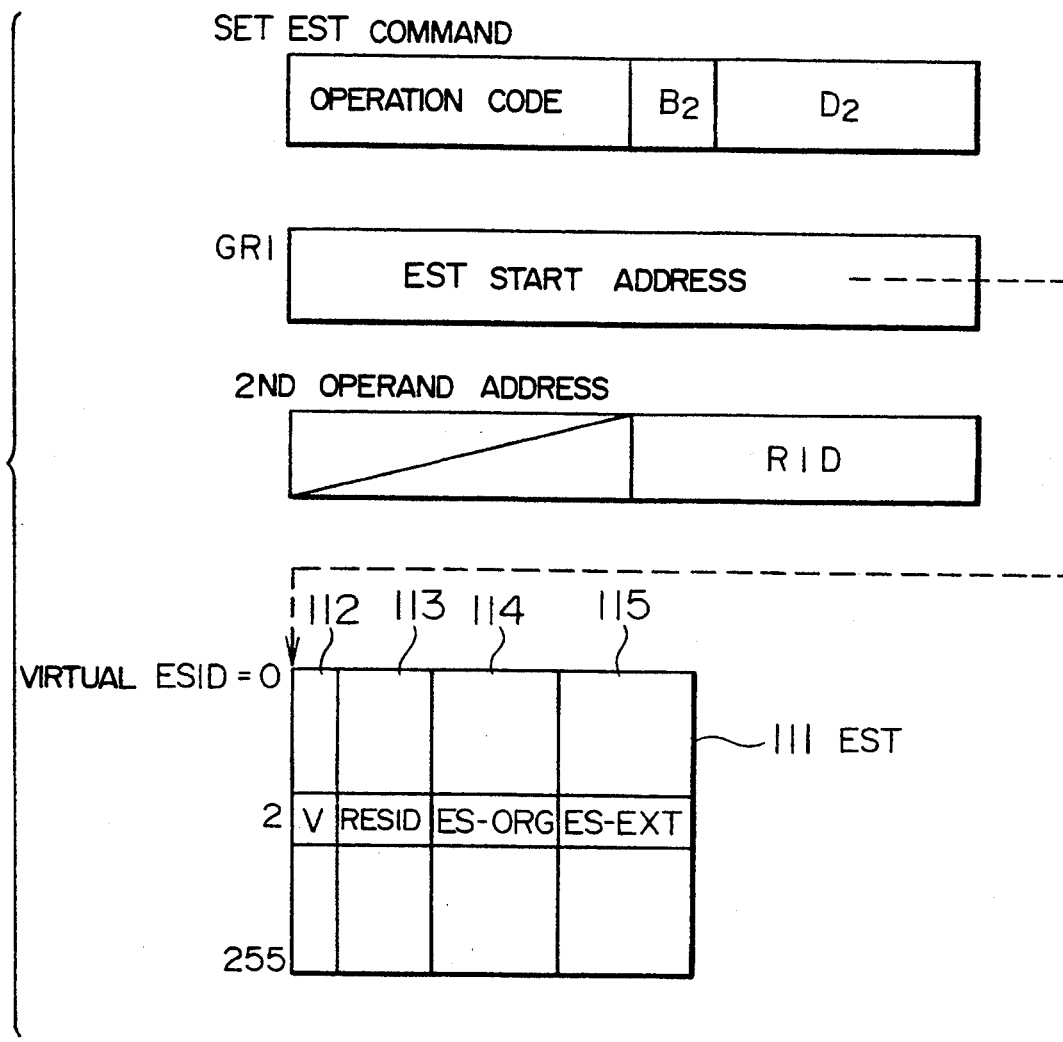

VIRTUAL MACHINE SYSTEM HAVING AN EXTENDED STORAGE

TECHNICAL FIELD

The present invention relates to a virtual machine system having an extended storage which is suitable for effecting data transfer while translating an address, which an operating system on the virtual computer has designated by a data transfer command to the extended storage, to a physical address.

BACKGROUND ART

Typical storages of a computer system includes a main storage, an extended storage and an input/output device.

JP-A-58-9276 which corresponds to U.S. Pat. No. 4,476,524 discloses an expanded storage (which is called a paging memory in the specification). In the system disclosed therein, high speed data transfer is attained between a main storage and the expanded storage by a conventional command or an input/output command.

JP-A-64-37636 which corresponds to U.S. patent application Ser. No. 079,314 discloses a method for imparting a storage area having a physical expanded storage split as an expanded storage for each VM in a virtual computer system in which a virtual machine (VM) which comprises a plurality of logical machines are generated on one computer and an operating system to run on each VM is permitted. However, the OS of each VM does not generate a virtual space for the expanded storage.

JP-A-60-122445 discloses a method for imparting a storage area having a physical main storage split as a main storage (virtual main storage) of the VM. According to the system disclosed therein, an address on the virtual space of the virtual main storage which a conventional command designates can be rapidly translated to a physical address. Further, according to the system disclosed therein, a channel can translate an address on the virtual main storage which a channel program of the OS designates to a physical address. In this manner, the conventional command of the VM and the input/output command which have the storage area having the physical main storage split can be rapidly executed.

The art disclosed in JP-A-64-37636 is very effective in rapidly effecting the data transfer between the virtual main storage of the VM which always resides on the physical main storage and the virtual expanded storage which always resides on the physical expanded storage. However, the following problems are encountered.

(a) The expanded storage of JP-A-64-37636 is used for paging. Accordingly, the OS on the VM is accessed only by the real address designation for the virtual expanded storage- The OS on the VM does not generate a virtual space for the virtual expanded storage. However, in order for a database system or an application program under the OS to use the expanded storage, it is desirable that the OS imparts a virtual space of the expanded storage to each program. Further, it is desirable that the data is directly transferred between the virtual space on the VM virtual storage and the virtual space on the virtual expanded storage. In this case, the translation information for translating an address (virtual ES address) on the virtual space on the virtual expanded storage to a real address (virtual physical ES address) on the virtual expanded storage may be prepared by the OS as a relocation table of the virtual main storage. The relocation table is provided not on the virtual expanded storage but on the virtual main storage because the main storage can be more rapidly accessed than the expanded storage is.

(b) Where the translation information for translating the virtual ES address to the virtual physical ES address is realized in the instruction processor as a relocation register, it is also desirable that the direct data transfer is effected between the virtual space of the VM virtual main storage and the virtual storage on the virtual expanded storage. The relocation table is provided not on the virtual main storage but as the register because the register can be more rapidly accessed than the main storage is.

(c) In JP-A-64-37636, the data transfer between the VM virtual main storage and the virtual expanded storage is effected by a conventional command other than the input/output command. However, it is desirable to effect the data transfer between the VM virtual main storage and the virtual expanded storage by the input/output command.

(d) It is desirable to enable the VM's to share the virtual expanded storage to enable sharing of data by the VM's.

DISCLOSURE OF INVENTION

It is an object of the present invention to provide a virtual machine system which effects direct data transfer between a virtual space on a VM virtual main storage and a virtual space on a virtual extended storage where an ES address translation table is given as a relocation table on a main storage.

It is another object of the present invention to provide a virtual machine system which effects the direct data transfer between the virtual space on the VM virtual main storage and the virtual space on the virtual extended storage where the ES address translation information is given as a relocation register in an instruction processor.

It is another object of the present invention to provide a virtual machine system which effects the data transfer between the VM virtual main storage and the virtual extended storage by an input/output command.

It is another object of the present invention to provide a data transfer execution apparatus of the virtual machine extended storage which efficiently executes the data transfer between a virtual main storage which an OS designates by a channel program and the virtual extended storage in the virtual machine system which has the virtual main storage and the virtual extended storage and in which one or more OS runs.

It is another object of the present invention to provide a virtual machine system which enables the VM's to share the virtual extended storage to enable sharing of data by the VM's.

In order to achieve the above objects, the virtual machine system in which a plurality of operating systems (OS's) can run on one computer having one main storage (physical main storage) and one or more extended storage (physical extended storage) and each of the OS's has one virtual main storage which always resides on the physical main storage and one or more virtual extended storage which always resides on the physical extended storage, comprises first translation means for reading an address (virtual physical ES address) on the virtual extended storage corresponding to the ES address based on the address (virtual ES address) on the virtual space of the virtual extended storage which the OS designates and the address of the ES relocation table on the virtual main storage of the OS, and second translation means for generating an address (physical ES address) on the physical extended storage corresponding to the virtual physical ES address based on the virtual physical ES address and a start address in the physical extended storage of the virtual extended storage of the OS.

When the OS which has the virtual main storage which always resides on the physical main storage and one or more virtual extended storage which always resides on the physical extended storage issues a data transfer command to transfer data between the virtual space on the virtual main storage and the virtual space on the virtual extended storage, the data transfer command is executed in the following manner.

The first translation means reads out the address (virtual physical ES address) on the virtual extended storage corresponding to the virtual ES address based on the address (virtual ES address) on the virtual space of the virtual extended storage which the OS designates and the address of the ES relocation table on the virtual main storage of the OS.

Then, the second translation means generates the address (physical ES address) on the physical extended storage corresponding to the virtual physical ES address based on the virtual physical ES address and the start address in the physical extended storage of the virtual extended storage of the OS. Then, the data transfer command of the OS is executed by using the translated physical ES address In this manner, the virtual machine system which effects the direct data transfer between the virtual space on the VM virtual main storage and the virtual space on the virtual extended storage when the ES address translation information is given as the relocation table on the main storage, is provided. Further, the same start address in the physical extended storage of the virtual extended storage is given to a plurality of VM's so that the virtual machine system which shares the virtual extended storage by the VM's and shares the data by the VM's is provided.

Further, a plurality of operating systems (OS's) may run on one computer which has one main storage (physical main storage) and one or more extended storage (physical extended storage).

The virtual machine system a plurality of operating systems (OS's) can run on one computer having one main storage (physical main storage) and one or more extended storage (physical extended storage) and each OS has one virtual main storage which always resides on the physical main storage and one or more virtual extended storage which always resides on the physical extended storage comprises:

third translation means for reading the address (virtual physical ES address) on the virtual extended storage corresponding to the virtual ES address based on the address (virtual ES address) on the virtual space of the virtual extended storage which the OS designates and the ES relocation register, and fourth translation means for generating the address (physical ES address) on the physical extended storage corresponding to the virtual physical ES address based on the virtual physical ES address and the start address in the physical extended storage of the virtual extended storage of the OS.

When the OS which has the virtual main storage which always resides on the physical main storage and one or more virtual extended storage which always resides on the physical extended storage issues the data transfer command to transfer data between the virtual space on the virtual main storage and the virtual space on the virtual extended storage, the data transfer command is executed in the following manner.

The third translation means reads out the address (virtual physical ES address) on the virtual extended storage corresponding to the virtual ES address based on the address (virtual ES address) on the virtual space of the virtual extended storage which the OS designates and the ES relocation register.

Then, the fourth translation means generates the address (physical ES address) on the physical extended storage corresponding to the virtual physical ES address based on the virtual physical ES address and the start address in the physical extended storage of the virtual extended storage of the OS. Then, the data transfer command is executed by using the translated physical ES address.

In this manner, the virtual machine system which effects the direct data transfer between the virtual space on the virtual storage of the VM and the virtual space on the virtual extended storage when the ES address translation information is given as the relocation register in the instruction processor, is provided. Further, the virtual machine system which shares the virtual extended storage by the VM's and shares the data by the VM's by giving the same start address in the physical extended memory of the virtual extended storage, to a plurality of VM's is provided.

Further, the virtual machine system in which a plurality of operating systems (OS's) can run on a computer system having one main storage (physical main storage) and one or more extended storage (physical extended storage and each of the OS's has one virtual main storage which always resides on the physical main storage and one or more virtual extended storage which always resides on the physical extended storage, comprises:

address relation hold means for holding the start address in the physical extended storage of the virtual extended storage for each OS, start address read means for reading the start address in the physical extended storage of the virtual extended storage corresponding to the address (virtual physical ES address) on the virtual extended storage which the channel program on the virtual main storage of the OS designates, based on the relation table of the OS, and fifth address translation means for generating the address (physical ES address) on the physical extended storage corresponding to the virtual physical ES address based on the virtual physical ES address and the start address.

Prior to the run of the OS, the start address in the physical extended storage of the virtual extended storage of the OS is registered in the relation table. The registration is required only once for each VM and it is not necessary for each VM dispatch.

When the OS which has the virtual main storage which always resides on the physical main storage and one or more virtual extended storage which always resides on the physical extended storage requests the execution of the channel program which commands the data transfer between the virtual main storage and the virtual extended storage, the data transfer is executed in the following manner.

The start address read means reads out the start address in the physical extended storage of the virtual extended storage corresponding to the address (virtual physical ES address) on the virtual extended storage which the channel program on the virtual main storage of the OS designates, based on the relation table of the OS.

Then, the fifth address translation means generates the address (physical ES address) on the physical extended storage corresponding to the virtual physical ES address based on the virtual physical ES address and the start address. Then, the channel program on the virtual main storage of the OS is executed by using the translated physical ES address.

In this manner, the virtual machine system which effects the data transfer between the VM virtual main storage and the virtual extended storage by the input/output command is provided. Further, the virtual machine system which shares the virtual extended storage by the VM's and shares the data by the VM's by giving the same start address in the physical extended storage of the virtual extended storage to a plurality of VM's is provided.

BRIEF DESCRIPTION OF THE DRAWINGS

FIG. 2 shows a main storage in accordance with the present invention, FIG. 3 shows an extended storage in accordance with the present invention, FIG. 4 shows a configuration of an instruction processor in first and second embodiments in which an address translator of the present invention is applied, FIG. 11 shows a circuit diagram of the address translator in the address non-translation mode in the second embodiment of the present invention, FIGS. 13 and 14 illustrate address translation information used in an address translator of a third embodiment of the present invention, FIG. 15 illustrates a command for setting the address translation information in the address translator of the third embodiment of the present invention, FIGS. 16 to 18 illustrate conventional CCW's, FIG. 17 shows a configuration of an input/output processor in the third embodiment in accordance with the present invention.

BEST MODE FOR CARRYING OUT THE INVENTION

Three embodiments of the present invention are now explained in detail with reference to the drawings. The outlines of those three embodiments are described below.

(A) First embodiment

System and method which allow the direct data transfer between the virtual space on the VM virtual main storage and the virtual space on the virtual extended storage where the ES address translation information is in the relocation table on the main storage.

(B) Second embodiment

System and method which allow the direct data transfer between the virtual space on the VM virtual main storage and the virtual space on the virtual extended storage where the ES address translation information is in the relocation register in the instruction processor.

(C) Third embodiment

System and method which allow the direct data transfer between the virtual main storage of the VM and the virtual extended storage by the input/output command.

The respective embodiments are now explained.

(A) First embodiment (A-1) Configuration of the virtual machine system

Figure 1:
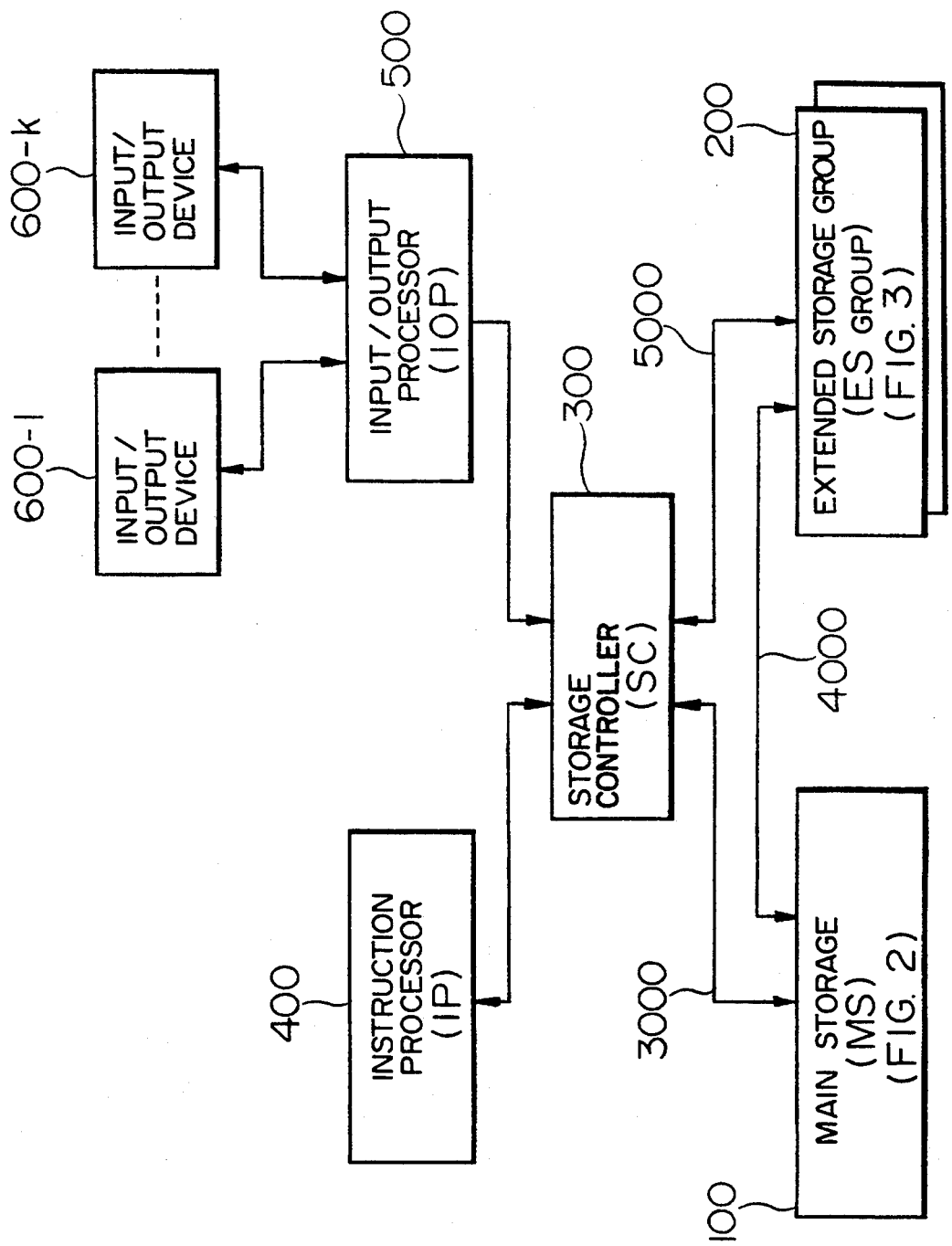
FIG. 1 shows a configuration of a virtual computer system in accordance with the present invention.

FIG. 1 shows a configuration of the virtual machine system in accordance with the present invention.

In FIG. 1, a numeral 100 denotes a main storage (MS), numeral 200 denotes an extended storage group (ES group) which comprises one or more extended storage, numeral 300 denotes a storage controller (SC), numeral 400 denotes an instruction processor (IP), numeral 500 denotes an input/output processor (IOP), and numerals 600-$l$ to 600-$k$ denote input/output devices.

As shown in FIG. 2, the main storage 100 includes a virtual machine control program (VMCP) which controls the run of the virtual machine (VM). Further, a virtual main storage 110-$i$ ($1 \leq i \leq n$) of the virtual machine (VMi) always resides in the main storage 100, and an operating system (OSi) for controlling the VMi is loaded in the virtual main storage. The OSi generates a virtual space 120-$i$ on the virtual main storage 110-$i$. An address translation table which defines the relation between the address (virtual main storage address) on the virtual space 120-$i$ and the address (virtual physical main storage address) on the virtual main storage 110-$i$ is provided in a segment table (ST) 111-$i$ and a page table (PT) 112-$i$. The ST 111 and the PT 112 are prepared by the OS for each virtual space. A real address (absolute physical address) on the main storage is produced by adding the address (virtual physical main storage address) on the virtual main storage 110-$i$ and a constant $\alpha i$.

As shown in FIG. 3, a virtual extended storage group 210-$i$ ($1 \leq i \leq n$) of the VMi always resides on the extended storage group 200-$j$ ($j=1, 2, 3-k$). The address on the extended storage group 200 is designated by a set of an extended storage identifier (ESID) for specifying one extended storage and a displacement address (block address) in the extended storage. FIG. 3 shows that the VM1 has virtual extended storages 210-1-1 and 210-1-2, the virtual extended storage 210-1-1 having the virtual ESID=0 always resides in an area having block addresses $\beta 1$ to $\beta 2$ of the physical extended storage 200-1 having the real ESID=1, and the virtual extended storage 210-1-2 having the virtual ESID =3 always resides in an area having block addresses $\gamma 1$ to $\gamma 2$ of the physical extended storage 200-2 having the real ESID=2. Further, the OSi generates a virtual space 220-$i$ of the ES on the virtual extended storage 210-$i$. The relation between the address (virtual ES address) on the virtual space 220-$i$ Of the ES and the address (virtual physical ES address) on the virtual extended storage 210-$i$ is given by a relocation table 114-$i$ on the virtual main storage 110-$i$. The address translation from the virtual ES address to the virtual physical ES address and the translation from the virtual physical ES address to the address (absolute physical ES address) on the physical extended storage will be described in detail later.

As will be described in detail later, the storage controller 300 controls the accesses from the instruction processor 400 and the input/output processor 500 to the main storage 100 and the extended storage 200, and controls an interface for the execution of the input/output command and the input/output interruption between the instruction processor 400 and the input/output processor 500.

As shown in FIG. 4, the instruction processor 400 comprises an instruction register 450 which holds an instruction currently being executed, an instruction decoder 451 for decoding an operation code, a general purpose register 452, an MS address register 453 which holds a virtual main storage address for the data transfer, a line register 454 and an adder 455 for incrementing the content of the MS address register 453, an ES address translator 440 for translating the virtual ES address designated by the program to a corresponding physical ES address, an MS address translator 410 for translating the virtual main storage address designated by the program to a corresponding physical main storage address, and an SC command decoder 456 which decodes a command sent from the storage controller (SC) 300 to the IP 400 to command the next operation.

(A-2) Method of the data transfer

The manner in which the data transfer command to transfer data between the virtual space on the virtual main storage 110-1 and the virtual space on the virtual extended storage group 210-1, issued by the virtual machine VM1, which has the virtual main storage 110-1 shown in FIG. 2 and the virtual extended storage group 210-1 shown in FIG. 3, during the run of the VM1 will now be explained with reference to FIG. 4.

The data transfer command comprises an operation code, a virtual ES address from which the data transfer is to be started, and an R1 field and an R2 field which indicate the numbers of general purpose registers which hold the virtual main storage addresses. When the data transfer command is stored into the instruction register 450 of FIG. 4, the instruction decoder 451 sends out a start signal including a direction of the data transfer to a signal line 2100. The instruction decoder 451 sends the contents of the general purpose registers 452 having the register numbers designated by R1 and R2 to data lines 2201 and 2301. Then, the virtual ES address sent out to the data line 2201 is translated to a physical ES address by the ES address translator 440 and it is sent out to a data line 2200. The physical ES address comprises a real ESID which specifies one of a plurality of extended storages, and a block address which indicates an address displacement in the extended storage. The virtual main storage address sent out to the data line 2301 is stored into the MS address register 453, sent out to a data line 2302, and translated by the MS address translator 410 to a physical main storage address, which is sent out to a data line 2300.

The operation of the SC 300 is now explained with reference to FIGS. 1 and 4. The SC 300 responds to the start signal received from the signal line 2100 to detect a data transfer request from the IP 400 and sends the direction of data transfer, the physical ES address received from the data line 2200 and the physical main storage address received from the data line 2300, to the main storage 100 from the data line 3000. The main storage 100 sends the received physical ES address from the data line 4000 to the extended storage 200-$j$ having the real ESID designated by the physical ES address. It further conducts the data transfer of a given number of bytes, for example 128 bytes in the area designated by the block address of the physical main storage address informed by the SC 300 and the physical ES address informed to the extended storage 200-$i$, in accordance with the direction of data transfer received from the SC 300. The extended storage 200-$j$ ($j=1, 2,-$) (FIG. 3) has a counter for counting one page (4096 bytes), although it is not described in detail. Each time the 128-byte data transfer is completed, the count is incremented by 128 bytes in the extended storage 200-$j$, and the data transfer address in the extended storage 200-$j$ is also incremented by 128 bytes. When the content of the counter which counts the incremented page does not exceed 4090 bytes, the extended storage 200-$j$ sends out a continuation of data transfer signal, and when it reaches 4096 bytes, it sends out an end of data transfer signal to the SC 300 through a signal line 5000 (FIG. 1). The SC 300 further sends it to the IP 400 through a signal line 2400.

The SC command decoder 456 of the IP 400 decodes whether the signal indicates the continuation or the end of the data transfer. If it is the continuation signal, an adder 455 is activated by a signal line 2401. The line register 454 contains 128, for example. As a result, a sum of the virtual main storage address transferred in the previous cycle and stored in the MS address register 453, and 128 is sent out to the data line 2302, and it is stored into the MS address register 453 and sent out to the MS address translator 410. Then, 128-byte data is again transferred in the direction designated by the signal lines 2100 and 3000 in the area designated by the physical main storage address translated by the MS address translator 410 and the data transfer address held in the extended storage 200-$j$. On the other hand, if the signal is the end signal, the next command is executed.

In this manner, the data transfer is conducted between the virtual space 120-1 on the virtual main storage 110-1 of the VM1 and the virtual space 220-1 on the virtual extended storage 210-1. The present embodiment is characterized by the application of the ES address translator 440 and the MS address translator 410 to the data transfer. The address translation by the MS address translator 410 and the ES address translator 440 is now explained.

(A-3) Address translator for the main storage (MS)

The address translation by the MS address translator 410 will now be explained with reference to FIGS. 5 and 6.

Figure 5:
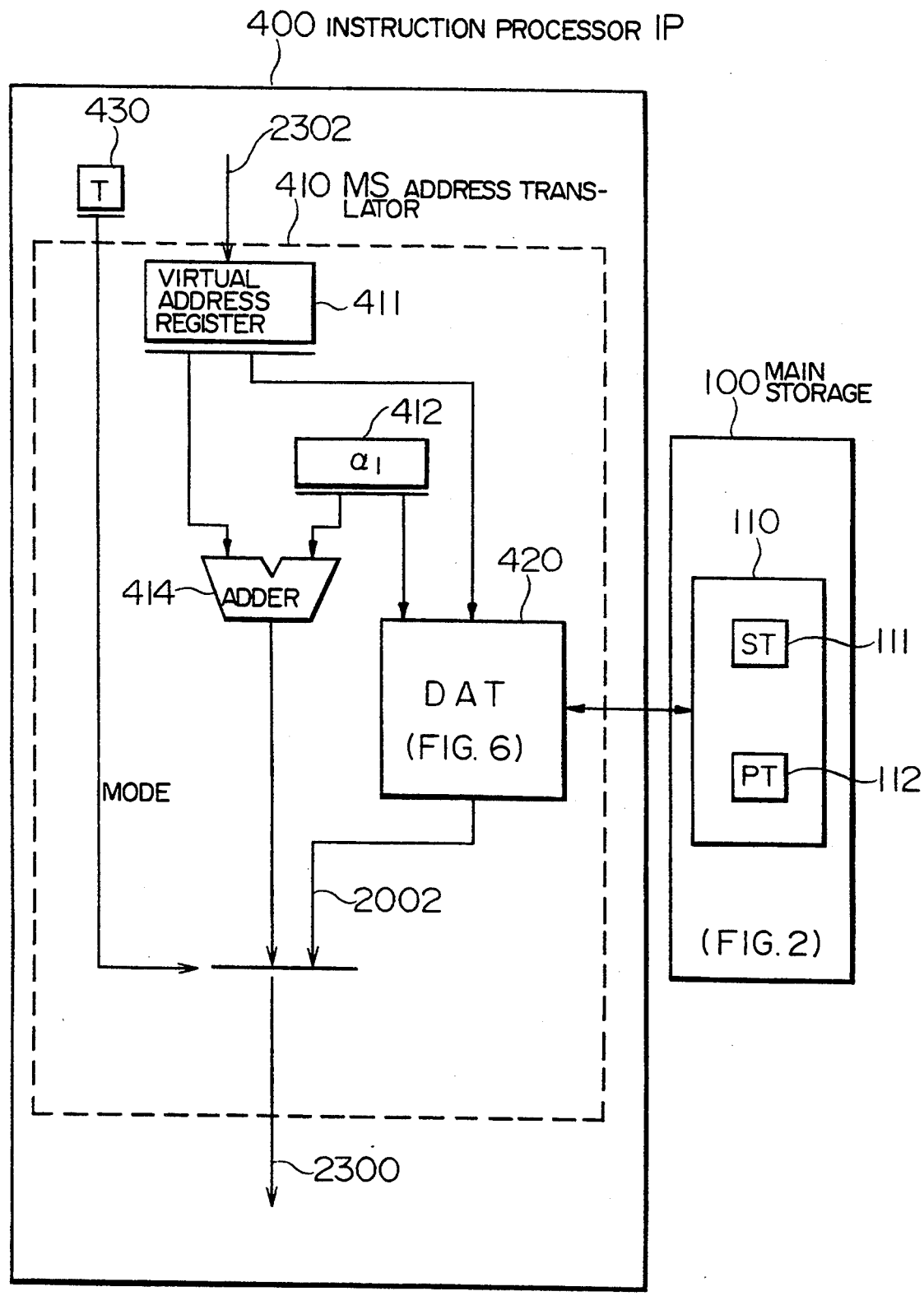
FIGS. 5 and 6 show configurations of prior art main storage address translators.
Figure 6:
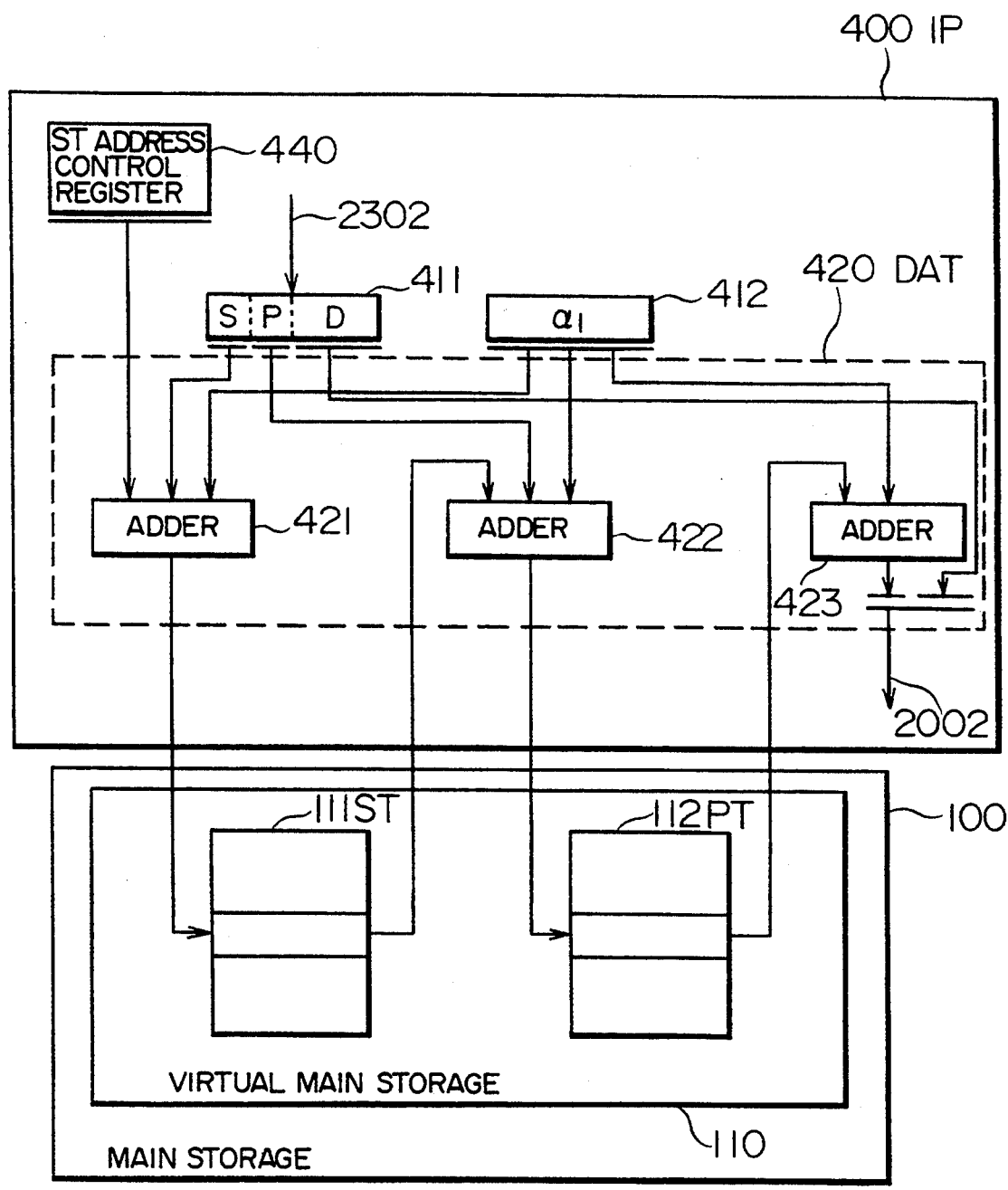

In FIG. 5, a virtual machine (VM) start address register 412 holds a start address in the physical main storage of the VM virtual main storage which now uses the IP 400. The start address in the physical main storage of the VM virtual main storage started by the VM start command issued by the VMCP 160 is set in the VM start address register 412. For example, during the run of the VM1 shown in FIG. 2, is set in the VM start address register 412. The virtual main storage address designated by the OS on the VM is held in the virtual address register 411.

When the VM is in the address non-translation mode, that is, when the content of the address translation mode register 430 is "0", the content of the virtual address register 411 and the content α1 of the VM start address register 412 are added together and the sum is sent out to the data line 2300 for use as the physical main storage address.

When the VM is in the address translation mode, that is, when the content of the address translation mode register 430 is "1", the content of the virtual address register is translated by a dynamic address translator (DAT) 420 into a physical main storage address which is sent out to the data line 2300 for use as the physical main storage address.

The address translation by the DAT 420 is explained with reference to FIG. 6. The segment table (ST) address control register 440 holds a top virtual physical main storage address of the segment table (ST) 111. A segment number field S of the virtual address register 411 and the content of the ST address control register 440 are added together by an adder 421 to produce the virtual physical main storage address having the entry corresponding to the ST 111. The content of the VM start address register 412 is further added to the virtual physical main storage address by the adder 421 to produce the physical main storage address having the entry of the ST 111. The content of the entry of the ST 111 produced is equal to the top virtual physical main storage address of the page table (PT) 112. Like in the case of the ST, the top virtual physical main storage address of the PT 112 is added to the page number field P of the virtual address register 411 and the content of the VM start address register 412 by an adder 422 to produce a physical main storage address having the entry of the PT 112. The adder 423 adds the content of the entry of the PT 112 and the content of the VM start address register 412. The sum is combined with the displacement field D of the virtual address register 412 to produce a corresponding physical main storage address, which is sent out to the data lines 2002 and 2300.

The address translation method by the MS address translator 410 of FIG. 4 has thus been described.

(A-4) Address translation of the extended storage

Prior to the explanation of the address translator of the VM extended storage of the present invention with reference to FIGS. 8, 9 and 10, an address translator 440' of the extended storage in a real machine will now be explained with reference to FIG. 7 in order to facilitate comprehension.

Figure 7:
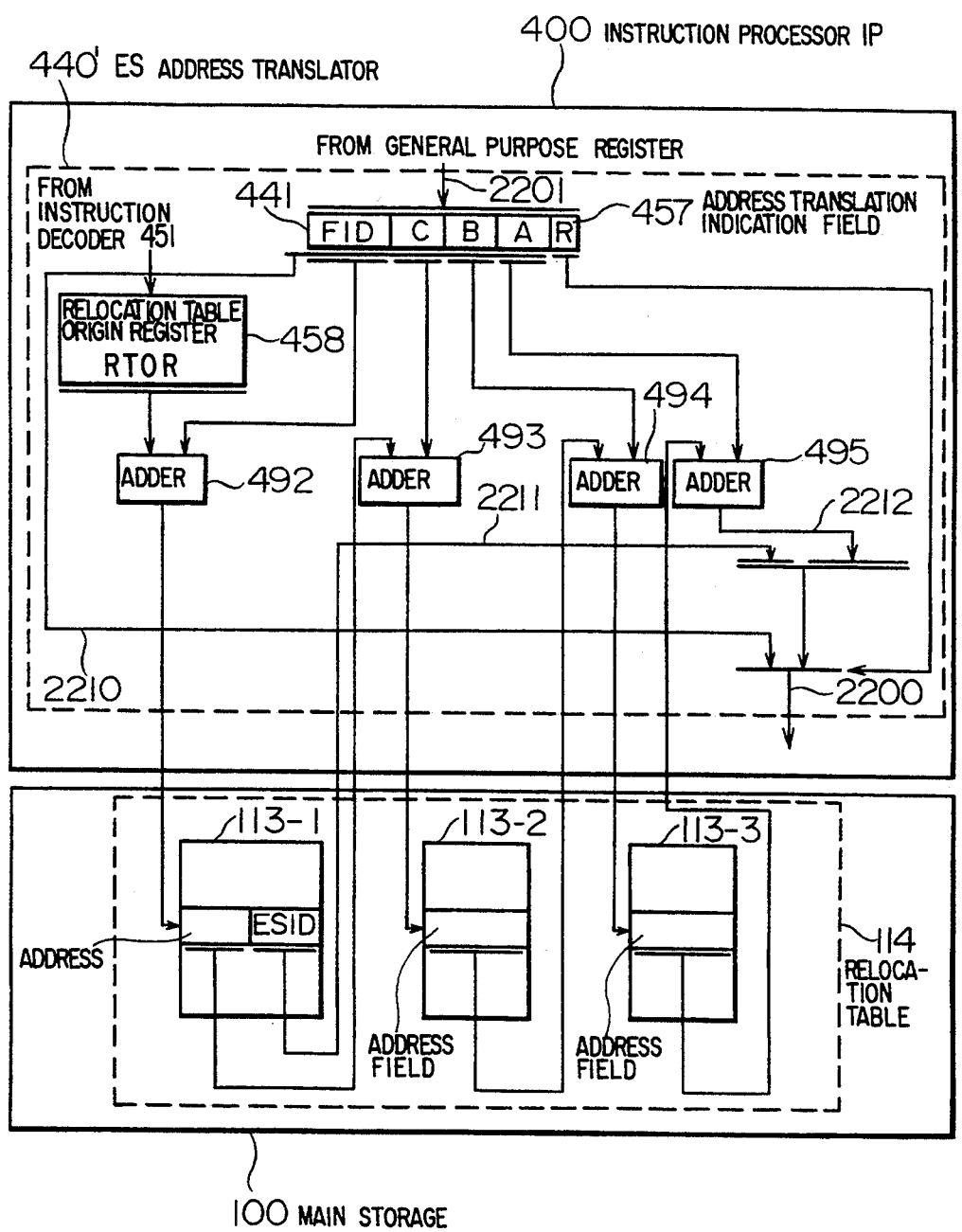
FIG. 7 shows a configuration of an address translator for an extended storage obtained in the development process of the present invention.

In FIG. 7, numeral 441 denotes a virtual ES address register which holds the virtual ES address designated by the data transfer command, numeral 457 denotes an address translation indication field which indicates whether the address held in the register 441 requires the translation by a relocation table (RT) 114 or not, numerals 113-1, 113-2 and 113-3 denote first, second and third relocation tables which form a relocation table 114, and numeral 458 denotes a relocation table origin register (RTOR) which holds the start physical main storage address of the first relocation table.

In FIG. 7, when the virtual ES address set in the virtual ES address register 441 indicates the address non-translation mode, that is, when the address translation indication field 457 is "0", the content of the virtual ES address register 441 excluding the address translation indication field 457 is sent out to the data line 2210. When the address translation indication field 457 is "0", the content of the data line 2210 is sent out to the data line 2200, and it is used, as it is, as a reference physical address of the extended storage. As described above, the physical address comprises the ESID which identifies one of a plurality of extended storages and a block address which indicates the address in the extended storage having the ESID.

The address translation process when the virtual ES address is in the address translation mode, that is, when the address translation indication field is "1", will now be explained.

The content of the RTOR register 458 and the FID field of the virtual ES address register 441 are added by the adder 492 to produce a physical main storage address of the entry corresponding to the first relocation table 113-1. The real ESID corresponding to the virtual ES address is stored in the entry of the first relocation table 113-1, and it is sent out to the signal line 2211. The start physical main storage address of the second relocation table 113-2 is also stored in the entry, and it is added to the C field of the virtual ES address register 441 by the adder 493 to produce a physical main storage address of the entry corresponding to the second relocation table 113-2. The start physical main storage address of the third relocation table 113-3 is stored in the entry of the second relocation table 113-2, and it is added to the B field of the virtual ES address register 441 by the added 494 to produce a physical main storage address of the entry corresponding to the third relocation table 113-3. The content of the entry of the third relocation table 113-3 and the displacement field A of the virtual ES address register 241 are added by the adder 495 and a resulting real block address is sent out to the signal line 2212. When the address translation indication field is "1", the ESID sent out to the data line 2211 and the real block address sent out to the data line 2212 are sent out to the data line 2200 for use as the physical ES address.

(A-5) ES address translator

The ES address translator 440 of the present invention is now explained with reference to FIG. 8. In FIG. 8, numeral 441 denotes a virtual ES address register which holds the virtual ES address designated by the program. Numeral 442 denotes an address non-translation mode address translator which translates the content of the virtual ES address register 441 to the corresponding physical address in the address non-translation mode, and numeral 445 denotes a DAT which translates the content of the virtual ES address register 441 to the corresponding physical address in the address translation mode, whether the mode is the address non-translation mode or the address translation mode is designated by the address translation indication field 457 in the virtual ES address.

Figure 8:
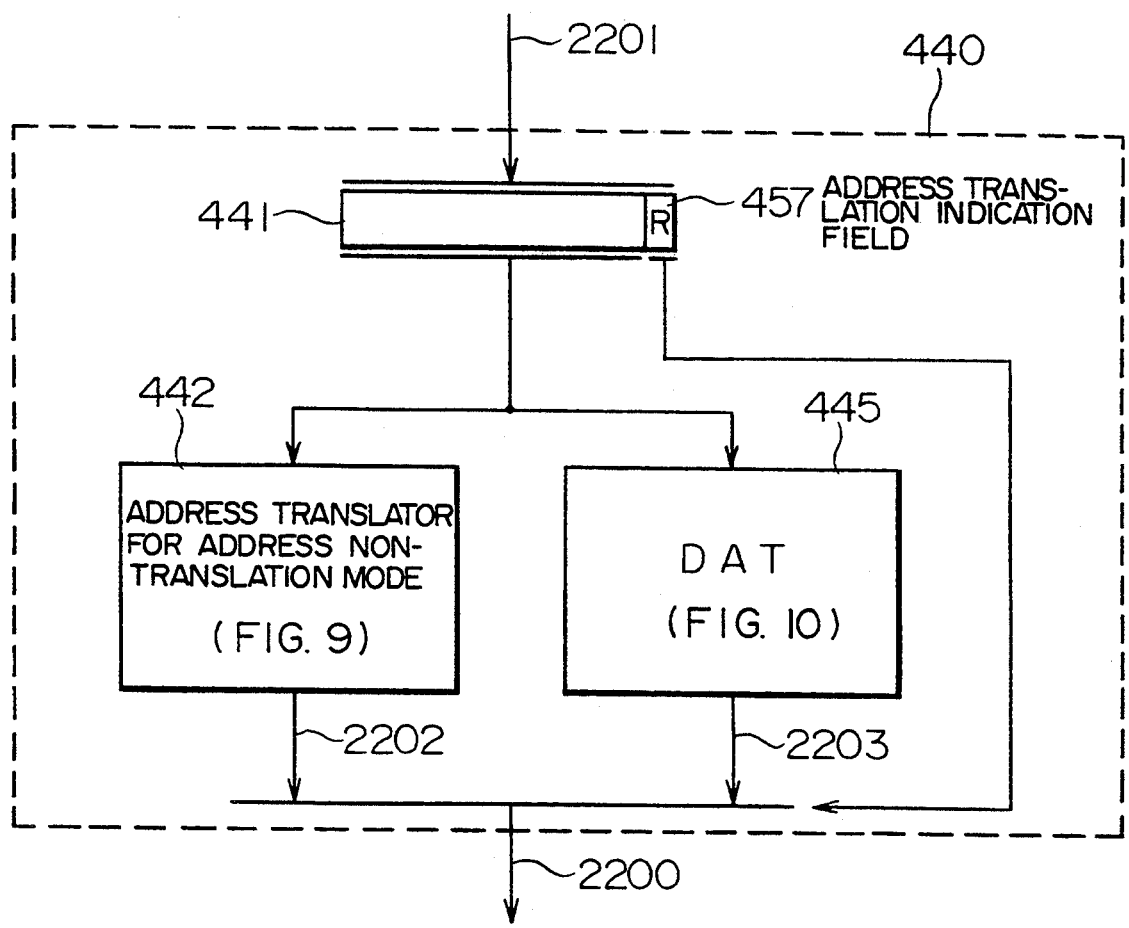
FIG. 8 shows an overall configuration circuit diagram of the address translator in the first and second embodiments of the present invention.

In FIG. 8, when the address translation indication field is "0" (address non-translation mode), the translated result by the address non-translation mode address translator 442 to be described later is sent out to the data line 2202, and it is activated and sent out to the signal line 2200. When the address translation indication field 457 is "1" (address translation mode), the translated result by the DAT 445 to be described later is sent out to the data line 2203, and it is activated and sent out to the signal line 2200.

Figure 9:
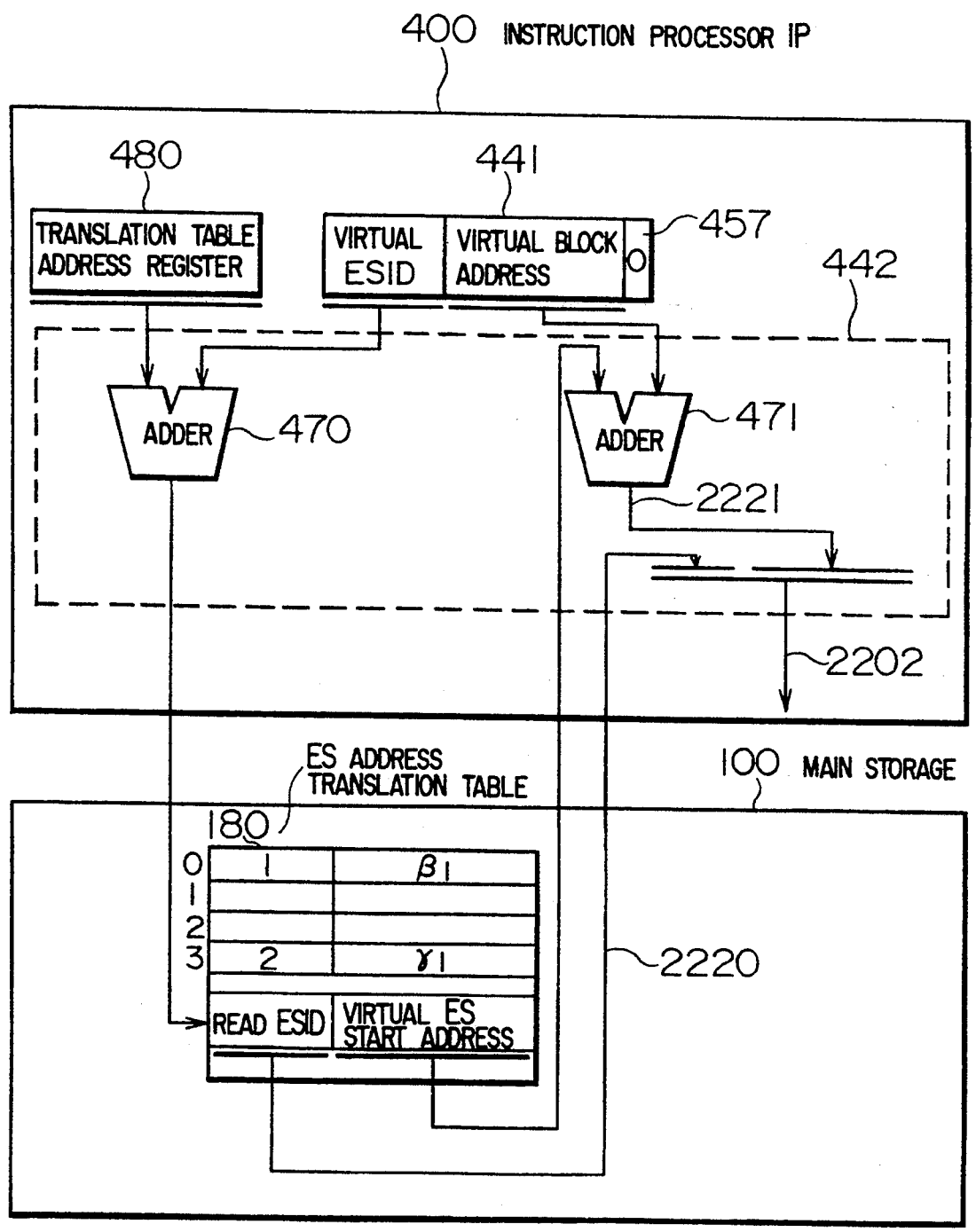
FIG. 9 shows a circuit diagram of the address translator in an address non-translation mode in the first embodiment of the present invention.
Figure 10:
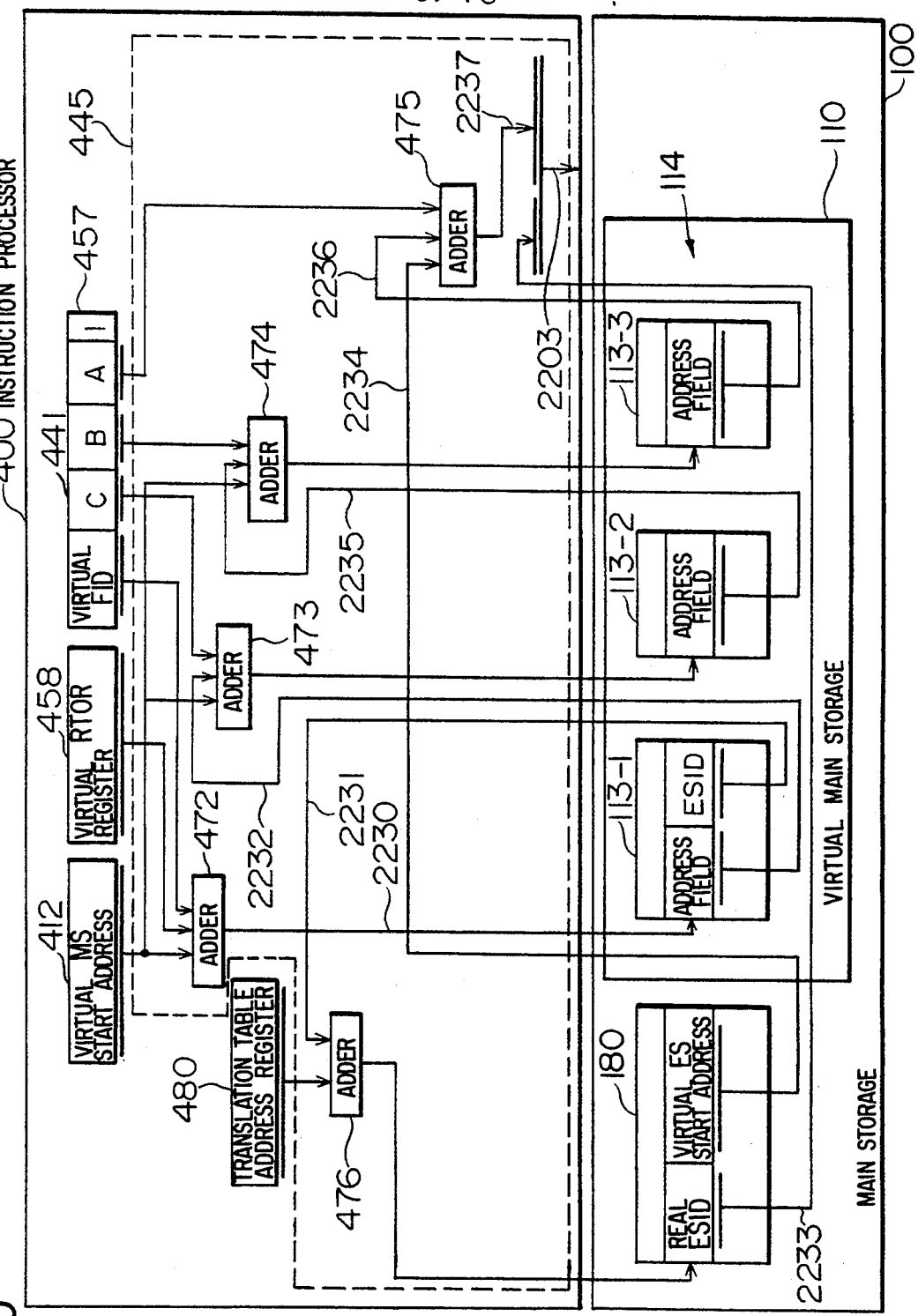
FIG. 10 shows a circuit diagram of the address translator in an address translation mode in the first embodiment of the present invention.

Referring to FIG. 9, the address translation by the address non-translation mode address translator 442 in the address non-translation mode, that is, when the address translation indication field 457 of the virtual address register 441 will now be "0", is explained. In FIG. 9, numeral 180 denotes an ES address translation table which holds a relation between the virtual extended storage group and the physical extended storage group, numeral 480 denotes a translation table address register which holds the top physical main storage address of the ES address translation table 180, numeral 470 denotes an adder which adds the content of the translation table address register 480 and the virtual ESID field of the virtual ES address register 441, and numeral 471 denotes an adder which adds the selected virtual ES start address field of the ES address translation table 180 and the virtual block address field of the virtual ES address register 441.

The ES address translation table 180 comprises a plurality of sets of entries which comprise sets of real ESID's and virtual ES start addresses as shown in FIG. 9. As shown in FIG. 3, in the VM1 in which the virtual extended storage group 210-1 and the real extended storage group 200 correspond to each other, the ES address translation table 180 is constructed as shown in FIG. 9. The ES address translation table of FIG. 8 indicates that the extended storage having the real ESID=1 corresponds to the virtual extended storage having the virtual ESID=0, and the area starting from the block address β1 is imparted. Similarly, it also indicates that the extended storage having the real ESID=2 corresponds to the virtual extended storage having the virtual ESID=3, and the area starting from the block address γ1 is imparted.

The VMCP sets the physical address of the ES address translation table 180 of the VM to the translation table address register 480 by the command which starts the VM.

Accordingly, the output of the adder 470 is the entry address of the ES address translation table 180 corresponding to the virtual ESID field of the virtual ES address register 441, and the real ESID field of that entry is sent out to the data line 2220. The sum of the virtual ES start address field of the entry and the virtual block address field of the virtual address register 441 produced by the adder 471 is sent out to the data line 2221. The contents sent out to the data lines 2220 and 2221 are the real ESID corresponding to the address held in the virtual address register 441 and the physical block address, and are sent out to the data line 2202 as the physical ES address.

The address modification by the DAT 445 in the address translation mode, that is, when the address translation indication field 457 of the virtual ES address register 441 is "1", will now be explained with reference to FIG. 10. In FIG. 10, the relocation table 114 which contains the translation information from the virtual ES address to the virtual physical ES address includes three tables, first relocation table 113-1, second relocation table 113-2 and third relocation table 113-3. Numeral 458 denotes a virtual RTOR register which holds the virtual physical main storage address of the first relocation table 113-1 of the VM. Numeral 472 denotes an adder which adds the content α1 of the virtual MS start address 412, the content of the virtual RTOR register 458 and the virtual FID field of the virtual ES address register 441, numeral 473 denotes an adder which adds the content α1 of the virtual MS start address 412, the address field of the selected first relocation table 113-1 and the C field of the virtual ES address register 441, numeral 474 denotes an adder which adds the content α1 of the virtual MS start address 412, the address field of the selected second relocation table 113-2 and the B field of the virtual ES address register 441, numeral 475 denotes an adder which adds the content of the virtual ES start address field of the selected ES address translation table 180, the address field of the selected third relocation table 113-2 and the content of the A field of the virtual ES address register 457, and numeral 476 denotes an adder which adds the content of the translation table address register 480 and the content of the ESID field of the selected first relocation table 113-1.

The output of the adder 472 is the physical main storage address of the entry of the first relocation table 113-1 of the VM corresponding to the FID field of the virtual ES address register 441, and the virtual ESID in the corresponding entry is sent out to the data line 2231 and the top virtual physical main storage address of the second relocation table 113-2 of the VM is sent out to the data line 2232. As a result, the output of the adder 476 is the physical main storage address of the entry of the ES address translation table 180 corresponding to the content of the virtual ES address register 441, and the content of the real ESID field of that entry is sent out to the data line 2233 and the start physical block address of the virtual extended storage is sent out to the data line 2234. The output of the adder 473 is the physical main storage address of the entry of the second relocation table 113-2 of the VM corresponding to the C field of the virtual ES address register 441, and the top virtual physical address of the third relocation table 113-3 of the VM is sent out to the data line 2235. As a result, the output of the adder 474 is the physical main storage address of the entry of the third relocation table 113-3 of the VM corresponding to the B field of the virtual ES address register 441, and the content of the address field of that entry is sent out to the data line 2236. As a result, the output of the data line 2236 and the content of the A field in the virtual ES address register 441 are added together by the adder 475 to produce the virtual block address, to which the start physical block address of the virtual extended storage sent out to the data line 2234 is added by the adder 475 to produce the physical block address corresponding to the content of the virtual ES address register 441, and it is sent out to the data line 2237. As a result, the real ESID sent out to the data line 2233 and the physical block address sent out to the data line 2237 are sent out to the data line 2203 as the physical address.

The address translation method by the ES address translator 440 has thus been described.

When the VMCP 160 imparts the same entry value to a plurality of ES address translation tables 180 of the VM's, the virtual extended storage may be shared by the VM's.

In the present embodiment, it is assumed that the virtual extended storage and the physical extended storage have the identification numbers (ESID'S) assigned thereto. However, it is clear that the data transfer is attained between the virtual space on the virtual main storage and the virtual space on the virtual extended storage even if the virtual extended storage and the physical extended storage are one at most, respectively, and no identification number is assigned(B)

Second embodiment

Figure 12:
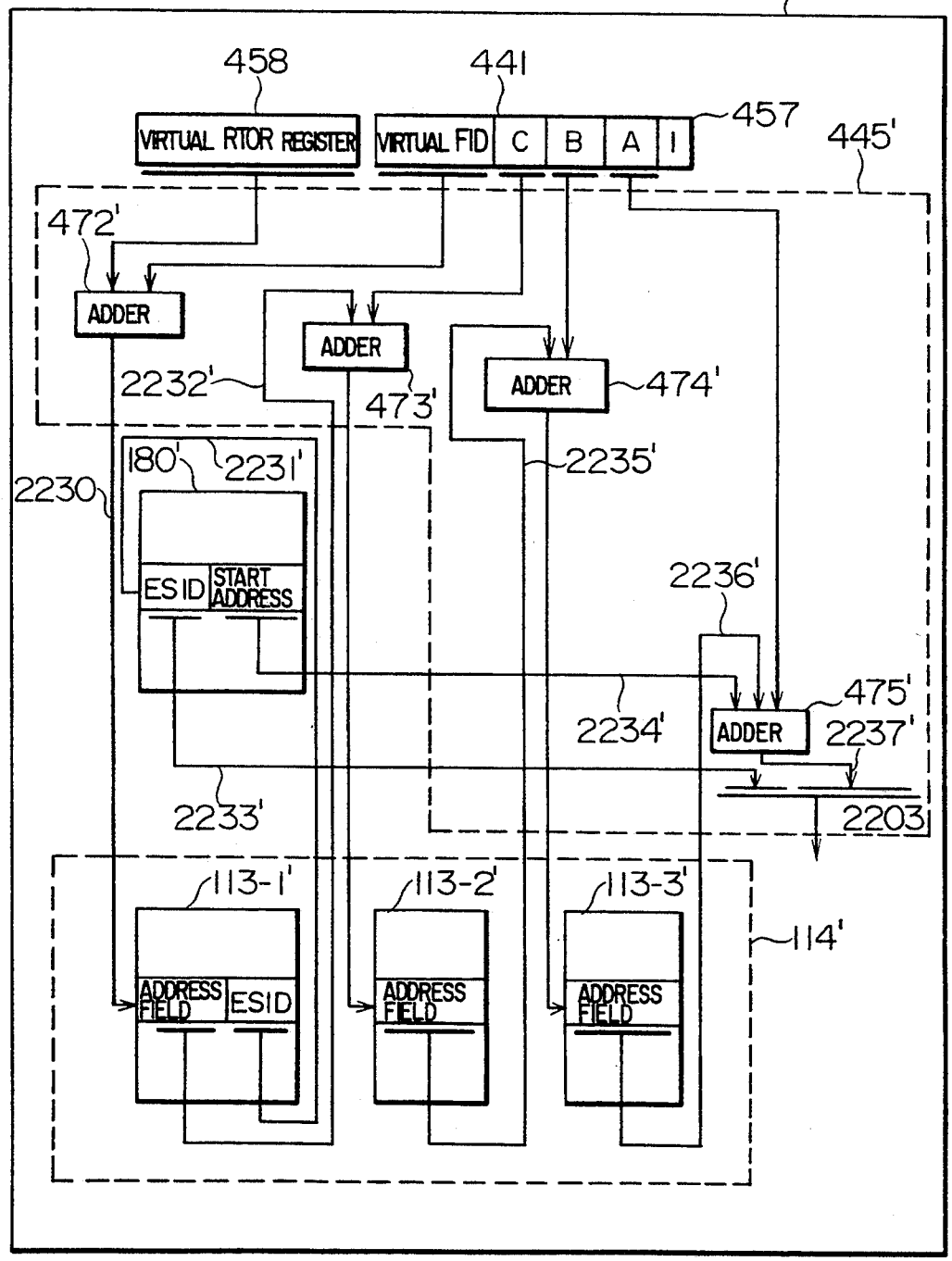
FIG. 12 shows a circuit diagram of the address translator in the address translation mode in the second embodiment of the present invention.

Referring to FIGS. 11 and 12, the second embodiment will now be explained. The difference from the first embodiment resides in that the ES address translation table 180 is provided on the main storage 100 in the first embodiment while an ES address translation table 180' is provided as a register in the instruction processor 400 in the second embodiment, and a relocation register 114' which corresponds to the relocation table 114 is provided as a register in the instruction processor 400. Thus, when the ES address translation table 180' is to be referred to, the translation table address register 480 in the first embodiment is not necessary in the second embodiment. When the relocation register 114' is to be referred to, the virtual MS start address register 412 in the first embodiment is not necessary. Except for these points, FIG. 11 corresponds to FIG. 9 and FIG. 12 corresponds to FIG. 10. Accordingly, a circuit in which the address non-translation mode address translator 442 of FIG. 8 has been replaced by 442 of FIG. 11 and the DAT 445 has been replaced by 445' of FIG. 12 is an overall configuration of the ES address translator 440 in the second embodiment.

Referring to FIG. 11, the address translation by the address non-translation mode address translator 442' in the address non-translation mode, that is, when the address translation indication field 457 of the virtual ES address register 441, will now be "0" is explained. The corresponding entry of the ES address translation table 180' is directly determined by the content of the virtual ESID field of the virtual ES address register 441, and the address non-translation mode address translator 442' sends out the real ESID field of that entry to the data line 2220'. The sum of the virtual ES start address field of that entry and the virtual block address field of the virtual address register 441 produced by the adder 471' is sent out to the data line 2221'. The contents sent out to the data lines 2220' and 2221' are the real ESID and the physical block address, respectively, corresponding to the virtual ES address held in the virtual ES address register 441, and they are sent out to the data line 2202 as the physical address.

Finally, referring to FIG. 12, the address translation by the DAT 445' in the address translation mode, that is, when the address translation indication field 457 of the virtual ES address register 441 is "1", will now be explained.

The output of the adder 472' is the entry number of the first relocation register 113-1' of the VM corresponding to the FID field of the virtual ES address register 441, and the corresponding virtual and the top register number of the second relocation register 113-2' of the VM is sent out to the data line 2232'. As a result, the output of the data line 2231' indicates the entry of the ES address translation table 180' corresponding to the content of the virtual ES address register 441, and the content of the real ESID field of that entry is sent out to the data line 2233' and the start physical block address of the virtual extended storage is sent out to the data line 2234'. The output of the adder 473' is the entry number of the second relocation register 113-2' of the VM corresponding to the C field of the virtual ES address register 441, and the top register number of the third relocation register 113-3' of the VM is sent out to the data line 2235' As a result, the output of the adder 474' is the entry number of the third relocation register 113-3' of the VM corresponding to the B field of the virtual ES address register 441, and the content of that address field is sent out to the data line 2236'. As a result, the output of the data line 2236', the content of the A field in the virtual ES address register 441 and the start physical address of the virtual extended storage sent out the data line 2234' are added together by the adder 475' to produce a physical block address corresponding to the content of the virtual ES address register 441, and it is sent out to the data line 2237'. As a result, the real ESID sent out to the data line 2233' and the physical block address sent out to the data line 2237' are sent out to the data line 2203 as the physical ES address.

In this manner, the data transfer is conducted between the virtual space on the virtual main storage of the VM and the virtual space on the virtual extended storage as is done in the first embodiment, by using the ES address translator 440.

When the VMCP 160 imparts the same entry number to the plurality of ES address translation tables 180' of the VM's, the virtual extended storage can be shared by the VM's.

In the present embodiment, it is assumed that the virtual extended storage and the physical extended storage have the identification numbers (ESID's) assigned thereto. However, it is apparent that the data transfer is attained between the virtual space on the virtual main storage and the virtual space on the virtual extended storage even if the virtual extended storage and the physical extended storage are at most one, respectively, and no identification number is assigned.

(C) Third embodiment

The configuration of the virtual machine system of the third embodiment is similar to that of the first embodiment except that the following elements have been added.

FIG. 13 shows a relation between the split of the real main storage area and the assignment of the area to the VM in the virtual machine system of the present invention, and control information for the input/output operation. In FIG. 13, a system area is one which the program may access, and the program and data handled by the program are stored in this area. On the other hand, a hardware area is one which the program cannot access and which is used by hardware of the real computer system.

The VMCP 160 which conducts the resource management of the entire computer in the system area is imparted with a continuous area from addresses $\alpha 1$ to $\alpha 2$ of the physical main storage 100 as the virtual main storage 110-1 of the VM1. Thus, the virtual physical main storage address x on the virtual main storage 110-1 which the OS designates by the channel program corresponds to the physical main storage address $x + \alpha 1$ on the main storage 100. Each virtual main storage 110-$i$ is assigned with a specific identifier (RID). The VM1 has the RID 1.

The sub-channels 120-$l$ to 120-$k$ in the hardware area store the control information of the input/output devices 600-$l$ to 600-$k$, respectively, and are used for the communication with the instruction processor 400 and the input/output processor 500 (see FIG. 1). The sub-channel 120-$j$ includes the start address of the channel program to be executed and the RID of the VM which exclusively uses the input/output device 600-$j$.

The ES address translation table 130 of the present invention is used when the virtual physical ES address of the VM is translated to the physical ES address. The configuration of the ES address translation table 130 will now be explained with reference to FIG. 14. The ES address translation table 130 is provided for each VM. The ES address translation table **130-*i* of the VM having the RID i comprises a validity (V) bit, a real ESID (RESID), a start address (ES-ORG) of the virtual extended storage in the physical extended storage, and an area length (ES-EXT) of the virtual extended storage, with the virtual ESID as the entry number. For example, the ES address translation table 130-*l* of the VM1 having the RID 1 as shown in FIG. 14 indicates that the virtual extended storages having the virtual ESID's 0 and 3 are valid (the V bits of the corresponding entries are "1"), the virtual extended storage having the virtual ESID 0 always resides on the physical extended storage having the real ESID with the start address $\beta_1$ and the area length $\beta_2-\beta_1$, and the virtual extended storage having the virtual ESID 3 always resides on the physical extended storage having the real ESID 2 with the start address $\gamma_1$ and the area length $\gamma_2-\gamma_1$. The ES address translation table 130-*n*** having the RID n indicates that the virtual extended storage having the virtual ESID 3 is valid (the V bit of the corresponding entry is "1"), and the virtual extended storage having the virtual ESID 3 always resides on the extended storage having the real ESID 2 with the start address $\gamma_1$ and the area length $\gamma_2-\gamma_1$. That is an area of the real extended storage shared by the VM's having the RID's 1 and n.

The execution sub-channel number 140 is used to inform to the input/output device 500 the sub-channel number which is the identification number of the sub-channel **120-*j* corresponding to the input/output device 600-*j* to which the instruction processor 400** requests the input/output processing.

An ES address translation table registration command (SET EST) provided in the present invention in order to set the ES address translation table 130 will now be explained with reference to FIG. 15. As shown in FIG. 15, the SET EST command comprises an operation code and a second operand address which indicates the RID. At the time of issuance of the command, the general purpose register GR1 indicates the start address of the address translation table EST 111 which has the same format as that of the ES address translation table **130-*i* of the VM. When the instruction processor 400 executes the SET EST command, the EST 111 in the system area is copied into the ES address translation table 130-*i*** having the RID (i) designated by the second operand address in the hardware area. Prior to the run of the VM-*i*, the VMCP 160 sets the virtual extended storage address translation information of the VM-*i* into the ES address translation table 130 by the SET EST command. The setting of the ES address translation table 130 may be effected once for each VM and need not be effected for each VM dispatch. For the VM which has no virtual extended storage, the EST 111 having all "0" bit entries is designated when the SET EST command is issued. In this manner, the ES address translation table 130 of the VM can be set in the hardware area.

The manner of execution of the channel program for the data transfer between the virtual main storage and the virtual extended storage, issued by the VM1 having the virtual main storage **100-*l* and the virtual extended storage 200-*l* shown in FIGS. 2 and 3 during the run of the VM1, will now be explained with reference to FIG. 19**.

As described in JP-A-58-9276 mentioned above, the channel command word (CCW) for the data transfer between the main storage and the extended storage by the channel includes a preparation for page-*in* (PPI) CCW shown in FIG. 16, a preparation for page-out (PPO) CCW shown in FIG. 17 and a copy page (CPG) CCW shown in FIG. 18. By the execution of the PPI and the CPG, one page of the area of the extended storage designated by the PPI is copied to the area of the main storage designated by the CPG, and by the execution of the and the CPG, one page of the area of the main storage designated by the CPG is copied to the area of the extended storage designated by the PPO.

When an SSCH command to start the input/output operation is issued to the sub-channel, the status of the sub-channel corresponding to the sub-channel number designated by the operand of the command is checked, and if the sub-channel is ready for the input/output operation, the channel program address designated by another operand of the same command is stored into the corresponding sub-channel **120-*j* and the sub-channel number is set to the execution sub-channel number 140, and the start of the input/output command is informed from the instruction processor 400 to the input/output processor 500. When the sub-channel is already executing the input/output operation or the sub-channel cannot accept a new input/output operation, a condition code corresponding to that status is set and the command is terminated and the start of the input/output command is not informed to the input/output processor 500**.

The operation of the input/output processor 500 after the start of the input/output command has been informed by the instruction processor 400 will now be explained.

Figure 19:
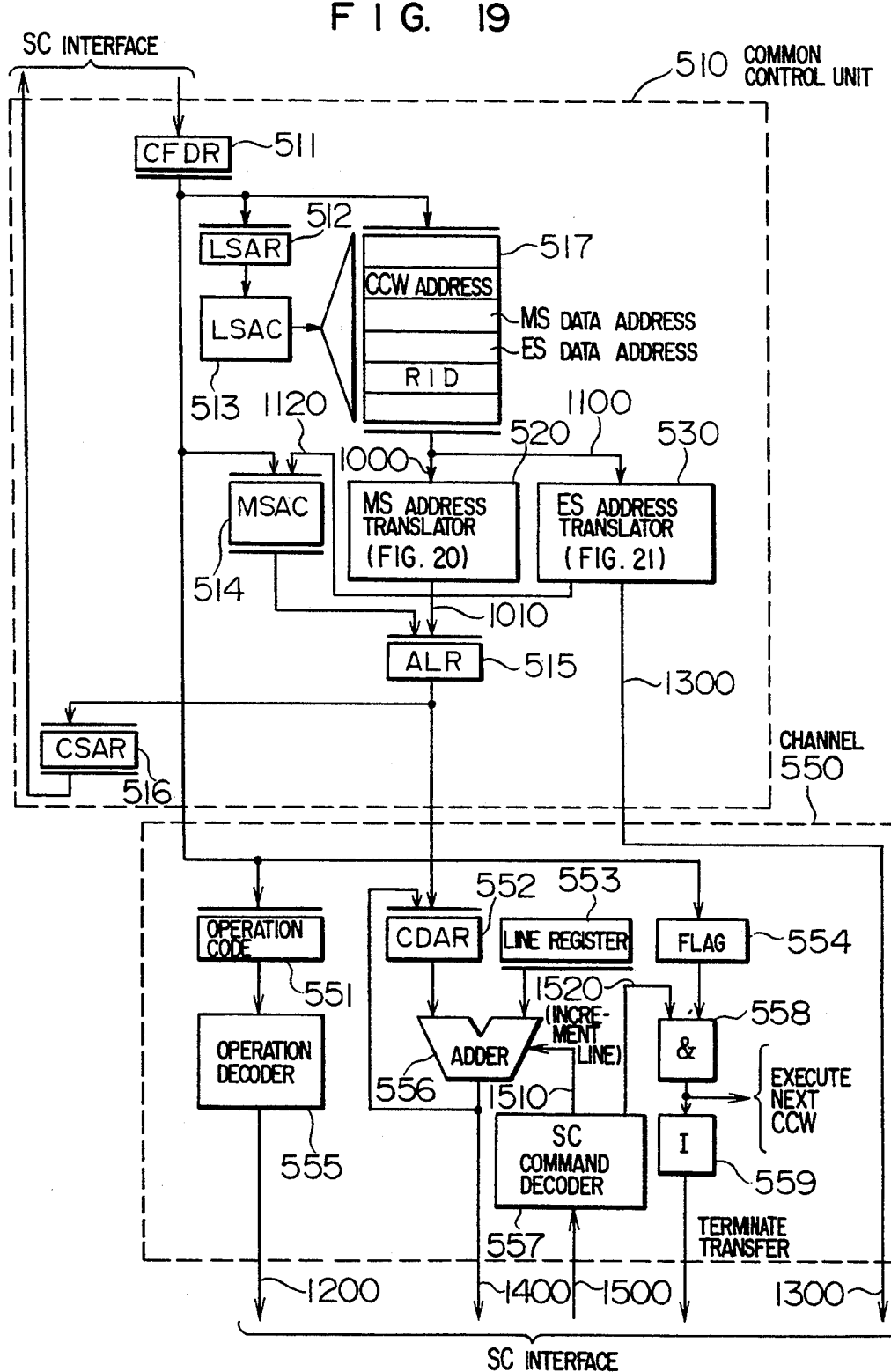

In FIG. 19, numeral 510 denotes a common control unit for controlling the channels of the input/output processor 500 in common, and numeral 550 denotes one channel selected from the channels. In actuality, a plurality of channels are connected. Numeral 511 denotes a register (CFDR) for holding data read from the main storage 100, numeral 517 denotes a local storage (LS) for centrally holding control information relating to the input/output control, numeral 512 denotes a register (LSAR) for holding an address used to access the LS 517, numeral 513 denotes an address generator (LSAC) for generating an address of the LS 517 based on the content of the LSAR, numeral 514 denotes a circuit (MSAC) for generating an address of a hardware area preset on the main storage, numeral 515 denotes a register (ALR) for holding an address of the main storage, numeral 516 denotes a register (CSAR) for holding an address used to access the main storage, numeral 520 denotes an MS address translator for translating a virtual main storage addresss to a physical main storage address, and numeral 530 denotes an ES address translator for translating a virtual ES address to a physical ES address in accordance with the present invention.

Numeral 551 in the channel 550 denotes an operation code register for holding a command code of the CCW under execution, numeral 552 denotes a register (CDAR) for holding and updating a main storage address for input/output data in the input/output operation, numeral 553 denotes a line register which holds a constant value (for example, 128), numeral 554 denotes a flag register which holds a flag field of the CCW being executed by the channel, numeral 555 denotes an operation decoder which decodes an operation code of the CCW, numeral 556 denotes an adder for adding the content of the CDAR 552 and the content of the line register 553, numeral 557 denotes an SC decoder for decoding a command from the SC 300, numeral 558 denotes an AND circuit, and numeral 559 denotes an inverter.

When the start of the input/output command is informed from the instruction processor 400 to the input/output processor 500, the input/output processor 500 reads the execution sub-channel number 140 on the main storage into the CFDR 511, supplies the sub-channel number to the MSAC 514 to generate the main storage address corresponding to that sub-channel, and reads out the sub-channel information including the CCW address and the RID from the main storage through the ALR 515 and the CSAR 516. The sub-channel information is then stored into a predetermined area of the LS 517 through the CFDR 511. Then, the channel designated by the channel designation information included in the sub-channel is selected. If the designated channel is ready to be started, the CCW address which is one of the sub-channel information (and which is a channel program address set in the sub-channel 120 by the instruction processor when the SSCH command is executed) is supplied to the MS address translator 520 from the LS 517 through the data line 1000, and the translated physical storage address is sent to the ALR 515 through the data line 1010 and the content of the ALR 515 is sent to the main storage through the CSAR 516 so that the CCW is read into the CFDR 511.

The operation of the MS address translator 520 will be explained later in detail.

When the CCW is read out, the command field and the flag field of the CCW are transferred to the operation code register 551 in the channel 550 and the flag register 554. When the data address field of the CCW indicates a virtual extended storage address (that is, when the CCW is the PPI or the PPO), it is supplied to the ES address translator 530 through the data line 1100 to send out the corresponding physical ES address to the data line 1300. The operation of the ES address translator 530 will be described later in detail. If the data address field of the CCW indicates the virtual main storage address, it is transferred to the data line 1000 and translated into the physical main storage address by the MS address translator 520, and the translated address is sent out to the data line 1010. The content of the ALR 515 sent out to the data line 1010 is transferred to the CDAR 552 in the channel 550 so that the input/output operation by the channel 550 is initiated.

Figure 20:
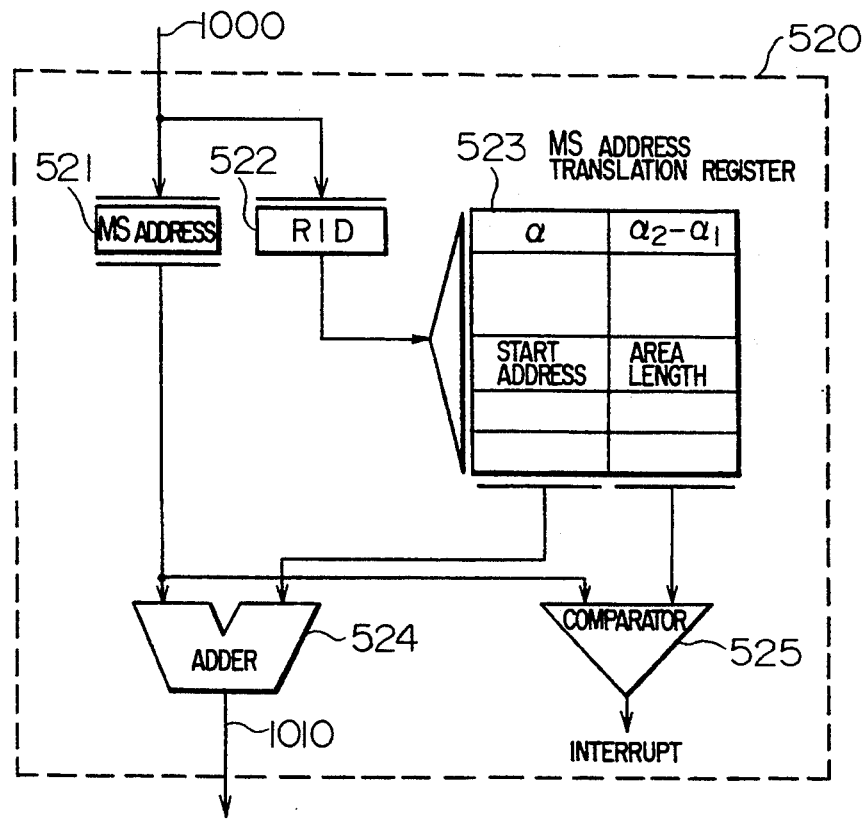
FIG. 20 shows a configuration of a prior art main storage address translator.

The address translation by the MS address translator 520 will not be explained with reference to FIG. 20. In FIG. 20, numeral 521 denotes an MS address register for holding a virtual main storage address to be translated, numeral 522 denotes an RID register for holding the RID of the sub-channel in which the input/ output operation is to be executed, numeral 523 denotes an MS address translation register for holding a start address and an area length in the physical main storage of the virtual main storage of the VM corresponding to the RID, numeral 524 denotes an adder, and numeral 525 denotes a comparator. The virtual main storage address supplied to the data line 1000 is set into the MS address register 521. Then, the RID of the sub-channel in which the input/output operation is to be executed is set into the RID register 522. The start address and the area length in the physical main storage of the virtual main storage of the VM corresponding to the RID have been stored in the MS address translation register 523. Thus, the content of the MS address register 521 is first compared with the area length by the comparator 525. When the output of the comparator 525 indicates that the content of the MS address register 521 is larger than the area length, the address exception is detected and the input/output operation is terminated, and a program check condition is reported to the program by the input/output interruption. On the other hand, if the address exception is not detected, the content of the MS address register 521 and the content of the start address are added by the adder 524 and the sum is sent out to the data line 1010 for use as the physical main storage address.

Figure 21:
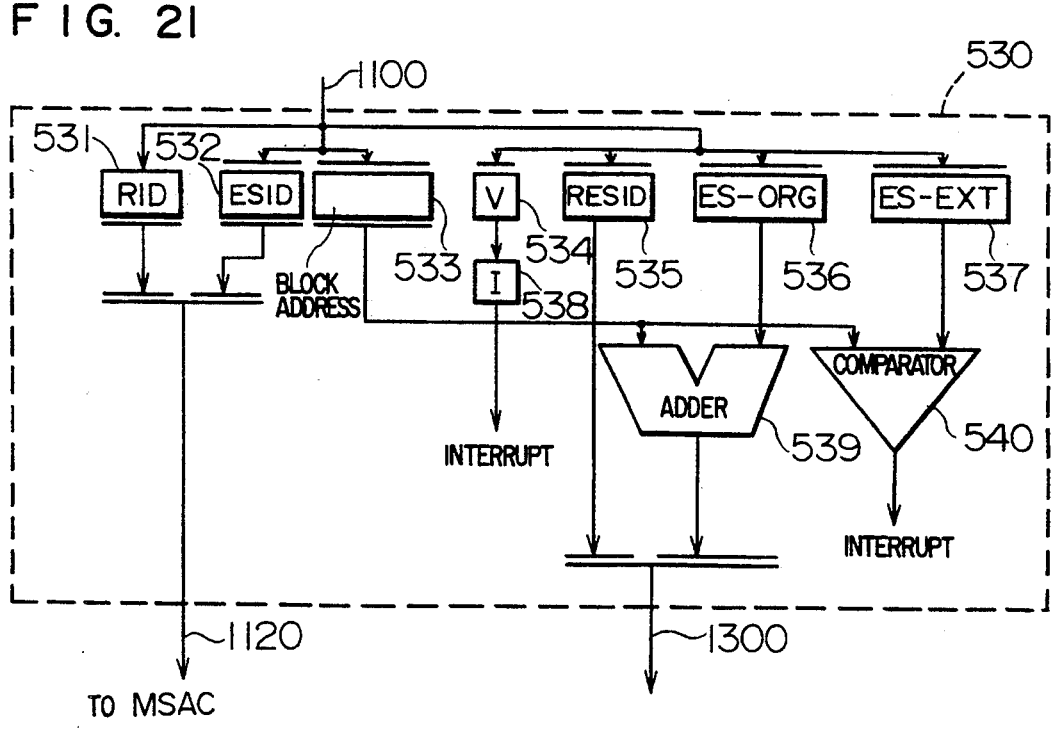
FIG. 21 shows a configuration of an extended address translator in the third embodiment of the present invention.

The operation of the ES address translator 530 will now be now explained with reference to FIG. 21. It is assumed that the extended storage address comprises a set of the ESID and the block address indicating the address displacement - In FIG. 21, numeral 531 denotes an RID register for holding the RID of the sub-channel in which the input/output operation is to be executed, numeral 532 denotes an ESID register for holding a virtual ESID of the virtual ES address to be translated, numeral 533 denotes a block address register for holding a block address of the virtual extended storage address to be translated, numerals 534 to 537 denote a V bit register, a RESID register, an ES-ORG register, and an ES-EXT register, respectively, for holding a V bit, a RESID, an ES-ORG and an ES-EXT of the entry of the ES address translation table 130 corresponding to the virtual extended storage address, numeral 538 denotes an inverter, numeral 539 denotes an adder and numeral 540 denotes a comparator. The virtual ESID of the virtual extended storage address supplied to the data line 1100 is set into the ESID register 532 and the block address is set into the block address register 533. Then, the RID of the sub-channel in which the input/output operation is to be executed is set into the RID register 531. Then, the contents of the RID register 531 and the ESID register are combined and the result is sent to the MSAC 514 over the data line 1120. The MSAC 514 selects the ES address translation table 130 of the VM designated by the RID in the RID register 531, and the virtual ESID of the corresponding ES address translation table 130-$i$ reads out the V bit, RESID, ES-ORG and ES--EXT of the entry corresponding to the content of the ESID register and sets them into the V bit register 534, the RESID register 535, the ES-ORG register 536 and the ES--EXT register 537 of the ES address translator 530. When the content of the V bit register 534 is '0', the output of the inverter 538 is "1" and the address exception is detected so that the input/output operation is terminated and the program check condition is reported to the program by the input/output interruption. The content of the block address register 533 and the content of the ES-EXT register 537 are compared by the comparator 540. If the output of the comparator 540 indicates that the content of the block address register 533 is larger than the content of the ES-EXT register 537, the address exception is detected and the input/output operation is terminated, and the program check condition is reported by the input/output interruption. On the other hand, if the address exception is not detected, the content of the block address register 533 and the content of the ES-ORG register 536 are added by the adder 539, and the resulting block address and the real ESID in the RESID register 535 are combined and the result is sent out to the data line 1300 for use as the physical extended storage address.

The operation of the channel 550 and the SC 300 will now be explained. When the content of the operation code register 551 is PPI or the PPO, the operation decoder 555 sends out a direction signal to the signal line 1200, and when the content of the operation code register 551 is CPG, it sends out a start signal to the signal line 1200.

In response to the start signal from the signal line 1200, the SC 300 detects the data transfer request from the IOP 500 and sends the direction of the data transfer indicated by the output of the operation decoder 555, the physical ES extended storage address received from the data line 1300 and the physical main storage address received from the data line 1400, to the main storage 100 through the data line 3000. The main storage 100 sends the extended storage address which it has received to the extended storage 200 of the real ESID designated by that address through the data line 4000. It further transfers the data of a predetermined number of bytes, for example 128 bytes, in accordance with the direction of the data transfer received from the SC 300, in the area indicated by the physical main storage address informed by the SC 300 and the block address of the physical ES address informed by the extended storage 200. The extended storage includes a counter for counting one page (4096 bytes) although it is not described in detail. It is incremented by 128 bytes each time the data transfer is completed, and the data transfer address of the extended storage 200 is also incremented by 128 bytes. When the content of the counter which counts the page does not exceed 4096 bytes, the extended storage 200 sends a continuation signal for the data transfer, and when the count reaches 4096 bytes, it sends a termination signal for the data transfer, to the SC 300 through the signal line 5000. The SC 300 further sends it to the IOP 500 through the signal line 1500.

The SC command decoder 557 of the channel 550 in the IOP 500 analyzes whether the signal indicates the continuation or the termination of the data transfer. If the signal indicates the continuation, the adder 556 is activated by the signal line 1510. The line register 553 contains 128, for example. As a result, the sum of the physical main storage address which has been transferred in the previous cycle and has been stored in the CDAR 552, and the value 128 is sent out to the data line 1400, and it is stored in the CDAR 552 and sent to the SC 300. Then, the 128-byte data is again transferred in the direction indicated by the signal lines 1200 and 3000 in the area indicated by the address corresponding to the main storage 100 and the data transfer address held in the extended storage. On the other hand, if the signal indicates the termination, the SC command decoder 557 indicates the termination of the data transfer and sends out "1" to the signal line 1520. As a result, if a command chain flag in the flag register 554 is "1", the next CCW is executed, and if the command chain flag is "0", the execution of the channel program is terminated.

In this manner, the data transfer between the virtual main storage 100-1 of the VM1 and the virtual extended storage 200-1 is executed by the IOP 500. Thus, after the instruction processor 400 has issued the SSCH command, it can execute other instructions until the execution of the channel program is terminated.

In accordance with the present embodiment, the data transfer between the virtual main storage and the virtual extended storage which the OS on the VM having the virtual main storage and the virtual extended storage designates by the channel program can be efficiently executed.

When the VMCP 160 imparts the same entry value to the ES address translation tables 180 of a plurality of VM's, the virtual extended storage can be shared by the VM's.

In the present embodiment, the virtual extended storage and the physical extended storage are assigned with the identification numbers (ESID). It is apparent that the data transfer between the virtual space on the virtual main storage and the virtual space on the virtual extended storage may be attained even if the virtual extended storage and the physical extended storage are one at most, respectively, and no identification number is assigned.

We claim:

1. A virtual machine system in which a plurality of operating systems (OS's) can run on one computer including a physical main storage (physical MS) and at least one physical extended storage (physical ES), each operating system (OS) of the OS's having a virtual MS on the physical MS and at least one virtual ES on the at least one physical ES, the system comprising:

ES address translation table storing means for storing an ES address translation table for each OS of the OS's, the ES address translation table including a start address of each virtual ES of the at least one virtual ES of said each OS in a corresponding physical ES of the at least one physical ES of the computer;

start address reading means for reading from the ES address translation table for one OS of the OS's the start address of one virtual ES of the at least one virtual ES of the one OS, the one virtual ES being a virtual ES on which an address has been designated by a channel program of the one OS, the channel program residing on the virtual MS of the one OS; and address translation means for translating the address on the one virtual ES designated by the channel program to a physical ES address on the physical ES corresponding to the one virtual ES based on the address on the one virtual ES designated by the channel program and the start address read by the start address reading means.

2. A virtual machine system in which a plurality of operating systems (OS's) can run on one computer including a physical main storage (physical MS) and at least one physical extended storage (physical ES), each operating system (OS) of the OS's having a virtual MS on the physical MS and at least one virtual ES on the at least one physical ES, the system comprising:

address translation means for translating an address on one virtual ES of the at least one virtual ES of one OS of the OS's to a physical ES address on one physical ES of the at least one physical ES of the computer, the one virtual ES being on the one physical ES, the address on the one virtual ES being designated by a channel program of the one OS, the channel program residing on the virtual MS of the one OS; and data transferring means for transferring data between the one virtual ES and the virtual MS of the one OS by using the physical ES address and a physical MS address on the physical MS, the physical MS address corresponding to an address on the virtual MS of the one OS, the address on the virtual MS of the one OS being designated by the channel program.

* * * * *